(12) United States Patent
Komatsu

(10) Patent No.: US 10,074,217 B2
(45) Date of Patent: *Sep. 11, 2018

(54) POSITION IDENTIFICATION METHOD AND SYSTEM

(71) Applicant: FUJITSU LIMITED, Kawasaki-shi, Kanagawa (JP)

(72) Inventor: Ryouta Komatsu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,309

(22) Filed: Oct. 13, 2016

(65) Prior Publication Data

US 2017/0032515 A1 Feb. 2, 2017

Related U.S. Application Data

(63) Continuation of application No. 14/665,231, filed on Mar. 23, 2015, now Pat. No. 9,495,802.

(30) Foreign Application Priority Data

Apr. 22, 2014 (JP) .................................. 2014-088540

(51) Int. Cl.
*G06T 19/00* (2011.01)
*G06F 3/03* (2006.01)
(Continued)

(52) U.S. Cl.
CPC ............ *G06T 19/006* (2013.01); *G06F 3/011* (2013.01); *G06F 3/0304* (2013.01);
(Continued)

(58) Field of Classification Search
CPC .................... G06T 19/006; G06K 9/00671
See application file for complete search history.

(56) References Cited

U.S. PATENT DOCUMENTS

2004/0046779 A1 3/2004 Asano et al.
2008/0094417 A1 4/2008 Cohen
(Continued)

FOREIGN PATENT DOCUMENTS

| JP | 2002-92647 | 3/2002 |
|----|------------|--------|
| JP | 2004-48674 | 2/2004 |
| JP | 2012-168798 | 9/2012 |

*Primary Examiner* — Jeffery A Brier
(74) *Attorney, Agent, or Firm* — Oblon, McClelland, Maier & Neustadt, L.L.P.

(57) ABSTRACT

A method includes acquiring a first image including a specific object and captured at an imaging position, generating first three-dimensional information based on a first shape of the specific object, the first three-dimensional information corresponding to the imaging position, generating second three-dimensional information based on a specific depth value and a designated position on the first image, generating first line information based on the first and the second three-dimensional information, acquiring a second image including the specific object and captured at another imaging position, generating third three-dimensional information based on a second shape of the specific object, the third three-dimensional information corresponding to the another imaging position, generating second line information based on the second and the third three-dimensional information, generating a fourth three-dimensional information based on the first and the second line information, and storing the fourth three-dimensional information associated with a content.

9 Claims, 26 Drawing Sheets

(51) Int. Cl.
*G06F 3/01* (2006.01)
*G06T 7/70* (2017.01)
*G06K 9/32* (2006.01)
*G06K 9/20* (2006.01)
*G06K 9/00* (2006.01)
*G06T 7/73* (2017.01)

(52) U.S. Cl.
CPC ....... *G06K 9/00671* (2013.01); *G06K 9/2063* (2013.01); *G06K 9/3216* (2013.01); *G06T 7/70* (2017.01); *G06T 7/74* (2017.01); *G06K 2009/3225* (2013.01); *G06T 2207/30204* (2013.01)

(56) References Cited

U.S. PATENT DOCUMENTS

| | | |
|---|---|---|
| 2011/0216090 A1 | 9/2011 | Woo et al. |
| 2012/0210255 A1 | 8/2012 | Ooi et al. |
| 2014/0247280 A1 | 9/2014 | Nicholas et al. |

FIG. 3

$$T = \begin{bmatrix} r11 & r12 & r13 & X1c \\ r21 & r22 & r23 & Y1c \\ r31 & r32 & r33 & Z1c \\ 0 & 0 & 0 & 1 \end{bmatrix}$$

$$R = \begin{bmatrix} r11 & r12 & r13 \\ r21 & r22 & r23 \\ r31 & r32 & r33 \end{bmatrix}$$

FIG. 4

$$R1 = \begin{bmatrix} 1 & 0 & 0 \\ 0 & \cos P1c & -\sin P1c \\ 0 & \sin P1c & \cos P1c \end{bmatrix}$$

$$R2 = \begin{bmatrix} \cos Q1c & 0 & \sin Q1c \\ 0 & 1 & 0 \\ -\sin Q1c & 0 & \cos Q1c \end{bmatrix}$$

$$R3 = \begin{bmatrix} \cos R1c & -\sin R1c & 0 \\ \sin R1c & \cos R1c & 0 \\ 0 & 0 & 1 \end{bmatrix}$$

FIG. 14

| AR CONTENT ID | Xm | Ym | Zm | Pm | Qm | Rm | Jx | Jy | Jz | TEMPLATE ID | MARKER ID | ADDITIONAL INFORMATION |
|---|---|---|---|---|---|---|---|---|---|---|---|---|
| 1000 | 20 | 25 | 10 | 0.0 | 0.0 | 0.0 | 1.0 | 1.0 | 1.0 | 10 | 100 | TEXT: A CRACK EXISTS! |
| ⋮ | ⋮ | ⋮ | ⋮ | ⋮ | ⋮ | ⋮ | ⋮ | ⋮ | ⋮ | ⋮ | ⋮ | ⋮ |

FIG. 15

| TEMPLATE ID | | 10 | |
|---|---|---|---|
| CORNER COORDINATES | 0 | (0, 0, 0) | ⎫ T1 |
| | 1 | (X3m, Y3m, Z3m) | |
| | 2 | (X4m, Y4m, Z4m) | |
| | 3 | (X5m, Y5m, Z5m) | |
| | 4 | (X6m, Y6m, Z6m) | |
| | 5 | ... | |
| | 6 | ... | |
| | 7 | ... | |
| | ... | ... | |
| 1 | ORDER OF CORNERS | 1, 3, 4, 5, 7 | ⎫ T2 |
| | TEXTURE ID | 21 | |
| 2 | ORDER OF CORNERS | 2, 3, 4, 5, 6 | |
| | TEXTURE ID | 21 | |
| ... | ORDER OF CORNERS | ... | |
| | TEXTURE ID | ... | |

FIG. 16

| PROVISIONAL AR CONTENT ID | AR CONTENT ID | START POINT ||| END POINT ||| Jx | Jy | Jz | TEMPLATE ID | MARKER ID | ADDITIONAL INFORMATION |
|---|---|---|---|---|---|---|---|---|---|---|---|---|---|
| | | Xms | Yms | Zms | Xme | Yme | Zme | | | | | | |
| 10 | 1000 | 10 | -5 | 20 | 10 | 20 | -100 | 1.0 | 1.0 | 1.0 | 1 | 100 | COLOR: GREEN |
| ⋮ | ⋮ | ⋮ | ⋮ | ⋮ | ⋮ | ⋮ | ⋮ | ⋮ | ⋮ | ⋮ | ⋮ | ⋮ | ⋮ |
| | | | | | | | | | | | | | |

POSITION IDENTIFICATION METHOD AND SYSTEM

CROSS-REFERENCE TO RELATED APPLICATION

This application is a continuation of and claims the benefit of priority under 35 U.S.C. § 120 from U.S. Ser. No. 14/665,231, filed Mar. 23, 2015, and claims the benefit of priority of the prior Japanese Patent Application No. 2014-088540, filed on Apr. 22, 2014, the entire contents of which are incorporated herein by reference.

FIELD

The embodiments discussed herein are related to a technique for superimposing and displaying image data on other image data.

BACKGROUND

An augmented reality (AR) technique is known, which is to superimpose and display an object such as image data or text data that does not exist in the real world on a real-world image acquired by imaging a real-world environment and displayed on a display and to provide a synthesized image as if the object existed in the real world. The object may be image data including text data or may be image data that evokes a characteristic meaning by a shape, a color, and the like of the object. Hereinafter, the object is referred to as an AR content.

Since a user who views the synthesized image may recognize that information displayed as the AR content is associated with a real space, the user may acquire a larger amount of information, compared with a case where the user visually recognizes a simple real-world environment.

The AR technique includes a technique that is referred to as location-based AR and a technique that is referred to as vision-based AR. The location-based AR is to acquire positional information of a terminal provided with a camera and information on an orientation from a GPS sensor or the like and determine, based on the positional information and the information on the orientation, details of an AR content to be superimposed and displayed on an image acquired by the camera and a position at which the AR content is superimposed and displayed.

Vision-based AR is to execute image recognition such as object recognition or space recognition on image data acquired by the camera. Then, if vision-based AR confirms that the image data is data of an image acquired by imaging a specific object, vision-based AR superimposes and displays an AR content associated with and prepared for the specific object based on a result of the image recognition (refer to, for example, Japanese Laid-open Patent Publications Nos. 2002-092647 and 2004-048674). In general, if a marker is recognized as the specific object, vision-based AR is referred to as marker vision-based AR in some cases. If an object other than markers is recognized as the specific object, vision-based AR is referred to as marker-less vision-based AR in some cases.

For the AR technique, a task of preparing an AR content is performed. For example, in vision-based AR, image data and text data that are to be displayed as the AR content are generated, and a position at which the AR content is arranged is set using the specific object as a reference. The task of preparing the AR content and a computer process are referred to as authoring. In this manner, the AR content is prepared by the authoring and superimposed and displayed by imaging a real-world space including the specific object by the camera after the preparation.

For example, an information processing device that is configured to support an authoring task to be performed by a user is known (refer to, for example, Japanese Laid-open Patent Publication No. 2012-168798). The information processing device displays an input image on a screen and detects a position specified by the user. Then, the information processing device calculates a three-dimensional position corresponding to the specified position and located in an augmented reality space, associates the three-dimensional position with a virtual object, stores the three-dimensional position and the virtual object.

Specifically, an image recognition unit that is included in the information processing device recognizes the specific object from the input image. Then, a calculator that is included in the information processing device calculates a position that corresponds to the position specified by the user and is located on a plane within a virtual space including a surface of the recognized object. The calculated position is a position at which the virtual object is arranged. In addition, the position at which the virtual object is arranged is adjusted in a depth direction in a virtual real space by providing an offset value to the information processing device from the user.

SUMMARY

According to an aspect of the invention, a position identification method to be executed by circuitry includes acquiring a first image including a specific object, the first image being captured by an image capturing device at an imaging position, generating first three-dimensional information based on a first shape of the specific object in the first image, the first three-dimensional information corresponding to the imaging position with respect to the specific object, generating second three-dimensional information based on a specific depth value and a designated position on the first image which is displayed on a display, generating first line information based on the first three-dimensional information and the second three-dimensional information, acquiring a second image including the specific object, the second image being captured by the image capturing device at another imaging position, generating third three-dimensional information based on a second shape of the specific object in the second image, the third three-dimensional information corresponding to the another imaging position with respect to the specific object, generating second line information based on the second three-dimensional information and the third three-dimensional information, generating a fourth three-dimensional information based on the first line information and the second line information, and storing, into a storage device, the fourth three-dimensional information associated with a content to be displayed on another image when the specific object is detected from the another image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a transformation matrix for transforming the marker coordinate system to the camera coordinate system and a rotation matrix;

FIG. 4 is a diagram illustrating rotation matrices;

FIG. 14 is a diagram illustrating an exemplary configuration of a data table storing AR content information;

FIG. 15 is a diagram illustrating an exemplary configuration of a data table storing template information;

FIG. 16 is a diagram illustrating an exemplary configuration of a data table storing provisional AR content information;

DESCRIPTION OF EMBODIMENTS

Figure 1:
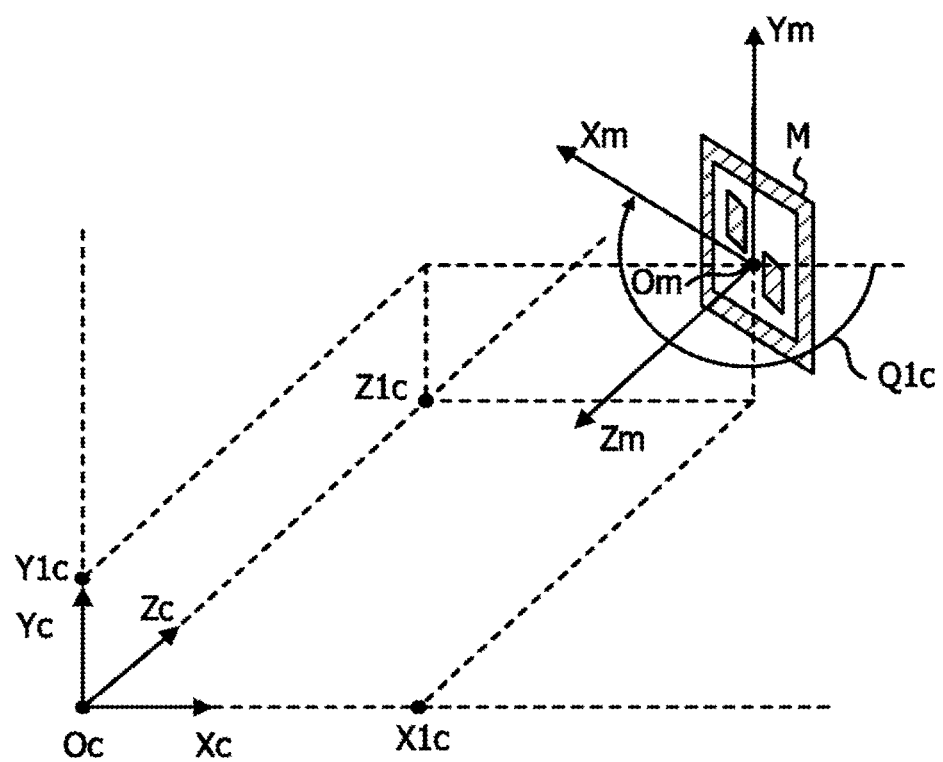
FIG. 1 is a diagram illustrating a relationship between a camera1 coordinate system and a marker coordinate system.

If a virtual object is arranged on a plane within a virtual real space including a planar surface of an object able to be recognized by an image recognition unit in a conventional information processing device, there is no problem. However, the following problem occurs if the virtual object is arranged at a position that is not located on the plane within the virtual real space including the planar surface of the object able to be recognized by the image recognition unit.

For example, in marker vision-based AR, a marker is recognized from an image. The aforementioned information processing device may arrange an AR content on a plane including a planar surface of the marker. However, if the AR content is to be arranged in front of or behind the marker, an offset value is input by a user.

If the user is forced to input the offset value, the user accurately quantifies the difference between a position at which the AR content is arranged by default and a position at which the user wants to arrange the AR content, and the user inputs the offset value. This causes a high task load for the user. In addition, the same applies marker-less vision-based AR.

An object of techniques disclosed in embodiments is to reduce a load of an operator in an authoring process executed on an AR content in vision-based AR and accurately set a position at which the AR content is arranged in a virtual real space.

Hereinafter, the embodiments are described in detail. The embodiments may be combined without contradiction of details of processes. Marker vision-based AR using a marker is described below as an example.

AR Display Process

Before the authoring process to be executed on an AR content according to a present embodiment is described, an AR display process using an AR content generated according to the present embodiment is described. The AR display process is a process of superimposing and displaying an AR content corresponding to image data of a specific object on image data acquired by a camera if it is determined that the image data of the specific object is included in the image data acquired by the camera. A marker is used as an example of the specific object in marker vision-based AR.

Marker vision-based AR is to virtually generate a virtual real space by overlapping a real space with a virtual space through a marker. The real space is a space imaged by the camera. The camera images the real space including the marker and another object. In the virtual space, an AR content is arranged while maintaining a specific positional relationship with the marker. The actual camera, however, is unable to image the virtual space.

Image data obtained on the assumption that the virtual real space is imaged is displayed by superimposing, on image data of the real space, image data obtained on the assumption that the virtual space is imaged. If a position at which the AR content is arranged is accurately set, the object and the AR content that exist while having predetermined positional relationships with the marker in the real space exist at corresponding positions in the virtual real space. Thus, the user who views a displayed AR image may recognize that the object and the AR content seem to be associated with each other.

In this case, in order to generate the virtual real space by overlapping the real space with the virtual space, a positional relationship between the position of the user and the position of the marker is to be determined. In this case, if image data of the marker is recognized to be included in the image data acquired by the camera, the positional relationship is determined using the image data of the marker.

The marker formed in a shape that enables the positional relationship between the marker and the camera to be determined is used. In addition, a distance between the marker and the camera is determined based on the size of the marker. The marker is, for example, an object printed on paper attached to a wall, a ceiling, equipment, or the like within a building. In addition, the marker has a specific characteristic. The specific characteristic is, for example, the shape or a combination of the shape, a color, and the like. For example, in the present embodiment, the marker is formed in a square with sides of 5 centimeters.

In order to recognize the marker, a template (dictionary) for object recognition is prepared. The dictionary is generated based on the specific characteristic of the marker or the like. The dictionary, however, is learned so as to ensure that the marker is able to be recognized even when the marker is imaged from a side other than a front surface of the marker.

FIG. 1 is a diagram illustrating a relationship between a camera coordinate system and a marker coordinate system. The camera coordinate system is a coordinate system in which the camera is located at the origin of the coordinate system. The marker coordinate system is a coordinate system in which the marker is located at the origin of the coordinate system. For example, in the marker coordinate system and the camera coordinate system, the size of the single marker in image data may be treated as a unit coordinate. In addition, 1 centimeter may be treated as an absolute value of an actual space or as the unit coordinate.

In FIG. 1, the origin of the camera coordinate system is Oc (0, 0, 0), and the camera coordinate system has three dimensions (Xc, Yc, Zc). A plane Xc-Yc is parallel to a surface of an imaging element of the camera. In addition, Zc axis is perpendicular to the surface of the imaging element. The origin Oc may be located at the same position as the actual position of the camera, the position of a focal point of the camera, or a position separated by a predetermined distance from the focal point of the camera in Zc direction.

The origin of the marker coordinate system is Om (0, 0, 0). The origin Om is located at the same position as the center of the marker M. The marker coordinate system has three dimensions (Xm, Ym, Zm). For example, a plane Xm-Ym of the marker coordinate system is parallel to the marker M, and Zm axis is perpendicular to the surface of the marker.

It is assumed that the origin Om of the marker coordinate system is represented by coordinates (X1c, Y1c, Z1c) in the camera coordinate system. The coordinates (X1c, Y1c, Z1c) of the origin Om in the camera coordinate system are calculated by executing the object recognition and the space recognition on image data acquired by the camera.

In FIG. 1, rotational angles of the marker coordinate system (Xm, Ym, Zm) with respect to the camera coordinate system (Xc, Yc, Zc) are represented by rotation coordinates G1c (P1c, Q1c, R1c). P1c is a rotational angle around Xc axis, Q1c is a rotational angle around Yc axis, and R1c is a rotational angle around Zc axis. Since the marker coordinate system exemplified in FIG. 1 is rotated only around Ym axis, P1c and R1c are 0. The rotational angles are calculated based on the comparison of the known shape of the marker M with the shape of an image of the marker M in the acquired image.

Figure 2:
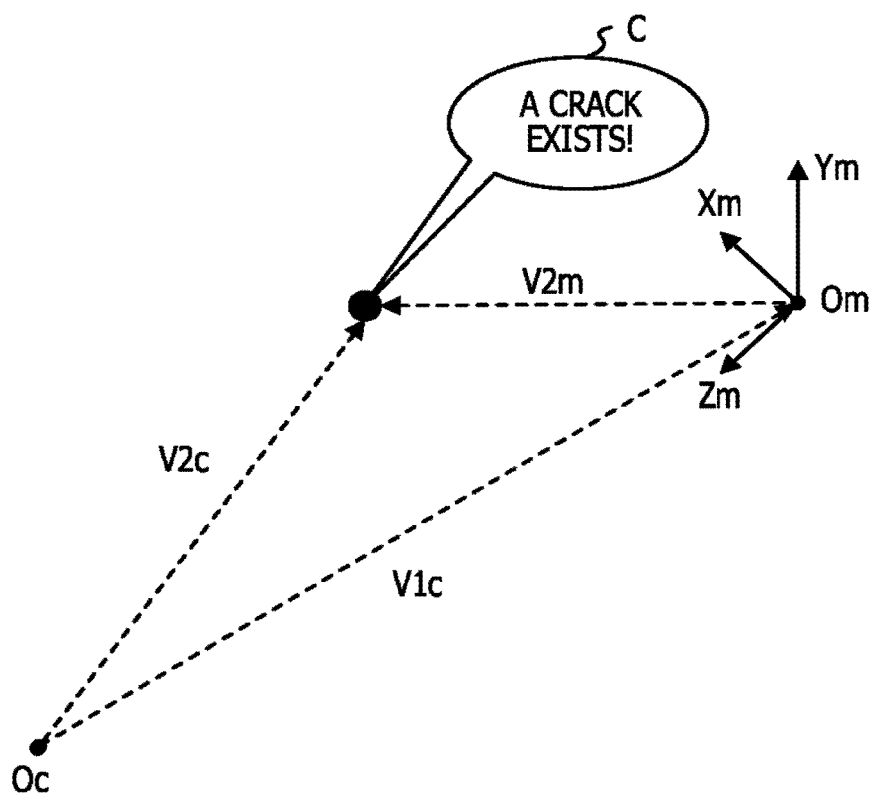
FIG. 2 is a diagram illustrating an example of an AR content in the marker coordinate system.

FIG. 2 illustrates an example of the AR content in the marker coordinate system. An AR content C illustrated in FIG. 2 is image data having a balloon-like shape and includes text information "A crack exists!" in a balloon of the image data. A position at which the AR content C is arranged is set by authoring in advance and defined as a predetermined positional relationship with the marker M. Specifically, the predetermined positional relationship with the marker M is positional information (coordinate values) of the AR content C in the marker coordinate system. In the same manner as the position at which the AR content C is arranged, the posture of the AR content C is defined as rotational information of the AR content C in the marker coordinate system.

The positional information and the rotational information are described in detail. In FIG. 2, a black circle pointed by the AR content C is a standard point V2m (X2m, Y2m, Z2m) of the AR content C. In addition, the posture of the AR content C is defined by rotation coordinates G2m (P2m Q2m, R2m), and the size of the AR content is defined by a magnification D (Jx, Jy, Jz). The rotation coordinates G2m of the AR content C indicate how much the AR content C is rotated with respect to the marker coordinate system. For example, if the coordinates G2m are (0, 0, 0) unlike the example illustrated in FIG. 2, the AR content C is displayed in parallel to the marker M.

Next, the shape of the AR content C is set by individually setting coordinates of points that form the AR content C and exclude the standard point. The present embodiment describes an example in which a template generated in advance is used for the shape of the AR content C. Specifically, the coordinates of the points forming the AR content C are defined in the template that is a model of the shape of the AR content C. Although details of the template for the AC content C are described later, coordinates of the standard point are (0, 0, 0), and the points other than the standard point are defined in the template as relative values with respect to the coordinates of the standard point. When the standard point V2m of the AR content C is set, coordinates of points forming the template are moved in parallel based on the coordinates V2m.

In addition, the coordinates of the points included in the template are rotated based on the set rotation coordinates G2m, and each of distances between points located adjacent to each other is increased or reduced by the magnification D. Specifically, the AR content C illustrated in FIG. 2 is formed based on the points adjusted based on the coordinates V2m of the standard point, the rotation coordinates G2m, and the magnification D. In this manner, the position of the AR content C to be arranged with respect to the marker M is identified based on the positional information of the AR content C and the rotational information of the AR content C.

Next, image data of the AR content C when a virtual space illustrated in FIG. 2 is imaged is superimposed on the image data actually acquired by the camera. A process of generating image data representing an image of the AR content C to be superimposed and displayed is described below.

The following processes are executed: a process of transforming the coordinates of the points of the AC content C defined in the marker coordinate system to the camera coordinate system and a process of projecting the points converted to the camera coordinate system on a display screen in order to draw the points converted to the camera coordinate system. In addition, the AR content C is superimposed and displayed by superimposing and drawing the image data representing the image of the AR content C on the image data acquired from the camera.

Transformation processes are described below. FIG. 3 illustrates a transformation matrix for transforming the marker coordinate system to the camera coordinate system and a rotation matrix. The transformation matrix T is a matrix for transforming the points of the AR content C defined in the marker coordinate system from the marker coordinate system to the camera coordinate system based on the coordinate values (X1c, Y1c, Z1c) of the origin Om of the marker coordinate system in the camera coordinate system and the rotation coordinates G1c (P1c, Q1c, R1c) of the marker coordinate system with respect to the camera coordinate system.

The transformation matrix T is a matrix of 4 rows and 4 columns. A column vector (Xc, Yc, Zc, 1) related to corresponding coordinates Vc of the camera coordinate system is obtained by calculating a product of the transformation matrix T and a column vector (Xm, Ym, Zm, 1) related to coordinates Vm of the marker coordinate system.

A rotation operation of matching an orientation in the marker coordinate system with an orientation in the camera coordinate system is executed by applying a partial matrix (rotation matrix R) of the first to third rows of the transformation matrix T and the first to third columns of the transformation matrix T to coordinates of the marker coordinate system. A translation operation of matching a position in the marker coordinate system with a position in the camera coordinate system is executed by applying a partial matrix of the first to third rows of the transformation matrix T and the fourth column of the transformation matrix T.

FIG. 4 illustrates rotation matrices R1, R2, and R3. The rotation matrix R illustrated in FIG. 3 is calculated by calculating a product (R1·R2·R3) of the rotation matrices R1, R2, and R3. The rotation matrix R1 represents a rotation of Xm axis around Xc axis. The rotation matrix R2 represents a rotation of Ym axis around Yc axis. The rotation matrix R3 represents a rotation of Zm axis around Zc axis.

The rotation matrices R1, R2, and R3 are generated based on the image data of the marker M in the image data acquired by the camera. Specifically, the rotational angles P1c, Q1c, and R1c are calculated based on how the image of the marker M having the known shape is to be acquired in the acquired image to be processed, as described above. The rotation matrices R1, R2, and R3 are generated based on the rotational angles P1c, Q1c, and R1c.

As described above, the column vector (Xc, Yc, Zc) that includes point coordinates of the camera coordinate system is obtained by substituting, into the column vector (Xm, Ym, Zm, 1), point coordinates included in the marker coordinate system and to be transformed and by executing a matrix operation. Specifically, point coordinates (Xm, Ym, Zm) of the marker coordinate system may be transformed to coordinates (Xc, Yc, Zc) of the camera coordinate system. The coordinate transformation is also referred to as model-view transformation.

For example, as illustrated in FIG. 2, by executing the model-view transformation on the standard point V2m of the AR content C, a point V2c (X2c, Y2c, Z2c) included in the camera coordinate system and corresponding to the standard point V2m defined in the marker coordinate system is calculated. In the aforementioned process, the position (positional relationship between the camera and the AR content C) of the AR content C with respect to the camera is calculated by using the image data of the marker M.

Next, the coordinates of the points of the AR content C in the camera coordinate system are transformed to a screen coordinate system. The screen coordinate system has two dimensions (Xs, Ys). Then, the image of the AR content C to be displayed is generated by projecting the coordinates, transformed to the camera coordinate system, of the points of the AR content C on a two-dimensional plane (Xs, Ys) that serves as a virtual screen.

Specifically, a part of the screen coordinate system corresponds to the display screen of the display. Transformation of coordinates of the camera coordinate system to the screen coordinate system is referred to as perspective transformation. For example, the virtual screen that serves as the projection plane is set so as to be parallel in an Xc-Yc plane of the camera coordinate system and separated by a predetermined distance from the Xc-Yc plane in Zc direction. In this case, if the origin Oc (0, 0, 0) of the camera coordinate system is set to be separated by a certain distance from the focal point of the camera in Zc direction, the origin (0, 0, 0) of the screen coordinate system corresponds to a single point on an optical axis of the camera.

The perspective transformation is executed based on a focal distance f of the camera. An Xs coordinate among coordinates, corresponding to coordinates (Xc, Yc, Zc) of the camera coordinate system, of the screen coordinate system is calculated according to the following Equation 1. In addition, a Ys coordinate among the coordinates, corresponding to the coordinates (Xc, Yc, Zc) of the camera coordinate system, of the screen coordinate system is calculated according to the following Equation 2. The projection plane may be set not to be parallel to the Xc-Yc plane. Different algorithms are applied to the perspective transformation based on set projection planes.

$$X_s = \frac{f \cdot X_c}{Z_c} \quad \text{(Equation 1)}$$

$$Y_s = \frac{f \cdot Y_c}{Z_c} \quad \text{(Equation 2)}$$

Data to be used to draw the AR content C is generated based on coordinate values, obtained by the perspective transformation, of the screen coordinate system. The AR content C is generated by mapping a texture to a plane obtained by interpolating a plurality of points forming the AR content C. In the template that is the source of the AR content C, points to be interpolated for the formation of the plane, the plane to which the texture is mapped, and the texture to be mapped are defined.

As described above, the AR content C is superimposed and displayed on input image data at a position corresponding to the specific object in the real space by transforming the coordinates of the points forming the AR content C from the marker coordinate system through the camera coordinate system to the screen coordinate system.

Authoring Process According to Embodiment

As described above, the position of the AR content C to be arranged is to be accurately specified in order to display the AR content C as if the AR content C whose position with respect to the marker M is determined is associated with a certain object having a specific positional relationship with the marker M in the real space.

According to an aspect of the technique disclosed in the present embodiment, a computer that includes an image capturing device and a display device displays first image data acquired by the image capturing device on the display device so as to ensure that the first image data includes specific image data (marker M). Then, the computer identifies, based on the shape of the specific image data, an imaging position at which the first image data is acquired. The computer is specified an arbitrary specific position on the first image data from a user. Then, the computer generates information of a first straight line extending through the imaging position and the specific position located on the first image data.

The user newly acquires second image data at another imaging position different from the aforementioned imaging position so as to ensure that the second image data includes the specific image data (marker M) and a specific position. The computer identifies the other imaging position of the second image data based on the shape of specific image data included in the second image data and generates information of a second straight line extending through the other imaging position and the specific position located on the second image data. Then, the computer identifies a position corresponding to the specific position and located in a three-dimensional space based on the information of the first straight line and the information of the second straight line. In addition, the identified three-dimensional position is set as the position of the AR content to be arranged.

The flow of the authoring process is briefly described below. In the present embodiment, a tablet computer provided with a camera is used as the computer that includes the image capturing device and the display device. In addition, it is assumed that the camera-equipped tablet computer according to the present embodiment has a touch panel display as a display device and a central processing unit (CPU) configured to execute processes. The user holds the camera-equipped tablet computer and moves the camera-equipped tablet computer to a location at which an object at which the AR content C is to be arranged exists. The camera-equipped tablet computer has a program enabling the AR display process and the authoring process to be executed, and the user performs an authoring task and views a displayed AR image by activating the program.

Hereinafter, a user who is an operator performing the authoring task and a user who is a viewer viewing a displayed AR image are each referred to as a user. The operator and the viewer may not be the same person, but are collectively referred to as the user, except in the case where the operator and the viewer are distinguished.

If the marker M is not attached, the user attaches the marker M in the vicinity of the object at which the AR content C is to be arranged. The user uses the camera-equipped tablet computer to image the marker M and the object. Since an image acquired by the imaging is displayed on the touch panel display of the camera-equipped tablet computer, the user touches a single point on the touch panel display while viewing the displayed image. In this case, the user touches the position of the displayed object at which the user wants to arrange the AR content C in the displayed image.

Information (two-dimensional information) of the position touched by the user is input to the CPU of the camera-equipped tablet computer from the touch panel display. The CPU determines, based on the information of the position touched by the user, an arrangement position at which the AR content is to be arranged in the marker coordinate system. The determined arrangement position, information of an object serving as the AR content C, and a marker ID are stored in a storage device.

A process of transforming the two-dimensional information of the touched position to three-dimensional information of the arrangement position in the marker coordinate system is described below. The information of the touched position is represented by coordinate values (Xs, Ys) in the screen coordinate system. However, if coordinate values of the touch panel do not correspond to coordinate values on the screen set as the projection plane, the transformation is executed.

Figure 5:
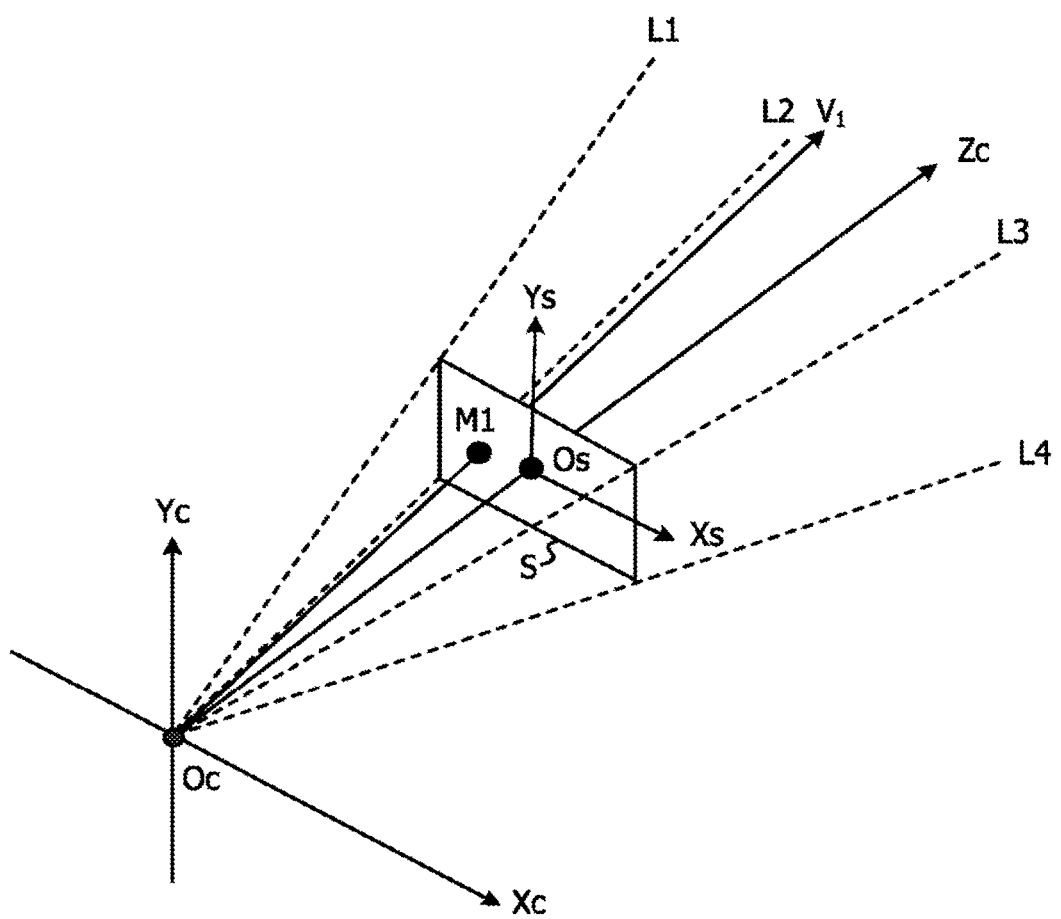
FIG. 5 is a diagram illustrating a relationship between a screen coordinate system and the camera coordinate system.

FIG. 5 is a diagram illustrating a relationship between the screen coordinate system and the camera coordinate system. The present embodiment assumes that the plane (Xs, Ys) of the screen coordinate system is set to be parallel to the Xc-Yc plane and to be separated by a predetermined distance from the Xc-Yc plane in Zc direction. Although not illustrated in FIG. 5, the marker M exists in a space surrounded by straight lines L1 to L4.

A display range of the display of the camera-equipped tablet computer is finite, and thus a partial region of the projection plane in the screen coordinate system is to be displayed. In FIG. 5, the partial region is illustrated as a region S. Specifically, an image is displayed on the display of the camera-equipped tablet computer by projecting the range surrounded by the straight lines L1, L2, L3, and L4 extending from the origin Oc of the camera coordinate system on the region S that is the part of the plane of the screen coordinate system.

The user confirms the image displayed on the display and touches a point M1 located on the display and corresponding to a position at which the AR content is to be arranged in the displayed image. The touched point M1 on the display is detected by the touch panel. The point M1 corresponds to coordinates of the screen coordinate system. Coordinates (Xs1, Ys1) are detected as coordinate information of the point M1.

Next, the region S that serves as the projection plane is set at a predetermined position in the camera coordinate system in Zc direction, and the point M1 is transformed to a corresponding three-dimensional position in the camera coordinate system based on the coordinates (Xs1, Ys1) input from the touch panel and the position in Zc direction at which the region is set. Thus, a straight line that extends through the origin Oc of the camera coordinate system and the point M1 is generated. The generated straight line is a group of points included in a three-dimensional space.

In FIG. 5, a vector V1 is illustrated instead of the straight line. In this manner, information that indicates a direction from the origin Oc of the camera coordinate system toward the point M1 may be added to the straight line connecting the origin Oc of the camera coordinate system to the point M1. The arrangement of the AR content C using the vector V1 is described below.

In the camera coordinate system, the direction (vector V1) from the user (camera) to the side on which the object at which the AR content is to be arranged exists may be identified, but a point that is located on the vector 1 at a three-dimensional position at which the user wants to arrange the AR content in the real space is not identified.

For example, the position of the AR content to be arranged is uniquely determined to be the same position (Zm=0 in the marker coordinate system) as the marker M on the vector V1 or the like based on a set requirement. The position of the AR content that is determined based on the marker M1 is at the aforementioned positional coordinates of the standard point of the AR content. Thus, the AR content formed of the plurality of points and having the balloon-like shape or the like is arranged using the standard point as a reference.

Figure 6:
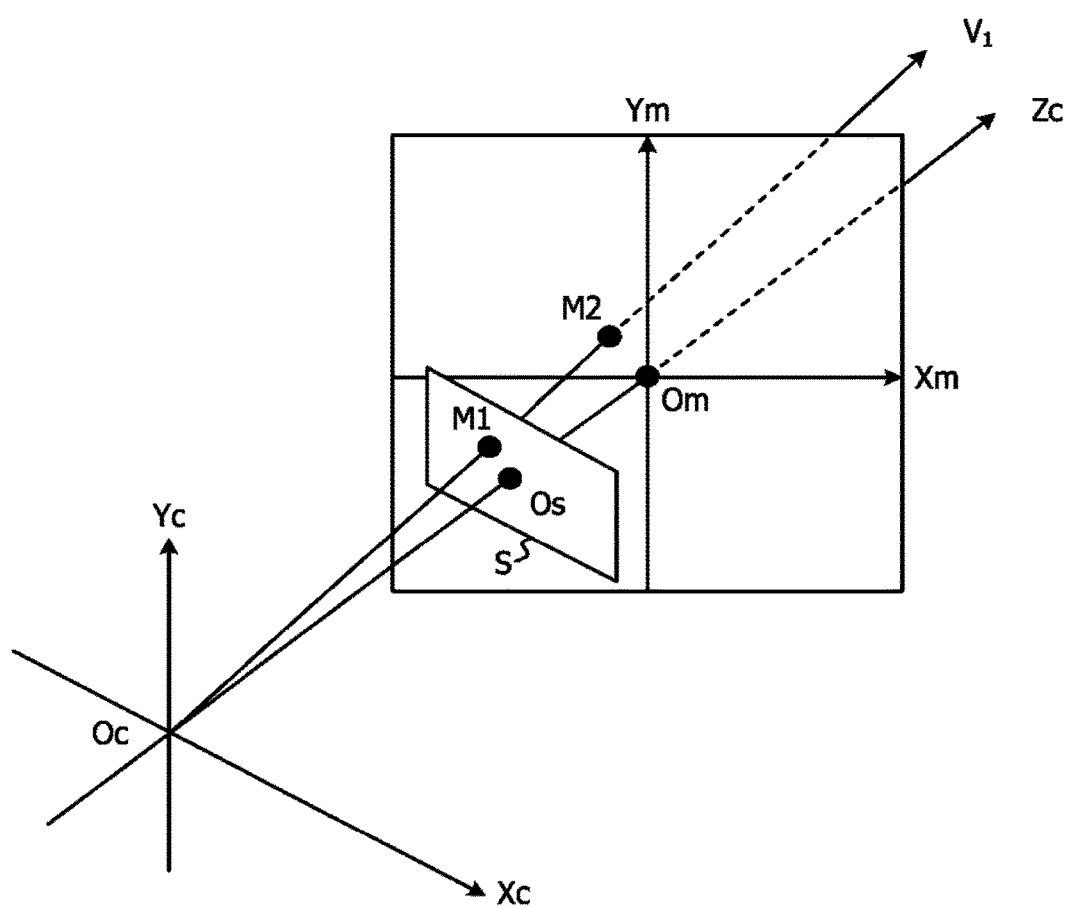
FIG. 6 is a diagram describing an AR content arranged at the same depth position as a marker.

FIG. 6 is a diagram describing the AR content arranged at the same depth position as the marker M. As illustrated in FIG. 1, since the Xm-Ym plane of the marker coordinate system is set to extend along the planar surface of the marker M, the position of the AR content C to be arranged is determined to be a point M2 at which the Xm-Ym plane intersects with the vector V1.

However, if the position of the AR content C to be arranged is determined by only the aforementioned method, the following problem occurs. The problem with the arrangement of the AR content C is described with reference to FIGS. 7, 8, 9, and 10. In the technique disclosed in the present embodiment, the position of the AR content C to be arranged is accurately determined by improving this method.

Figure 7:
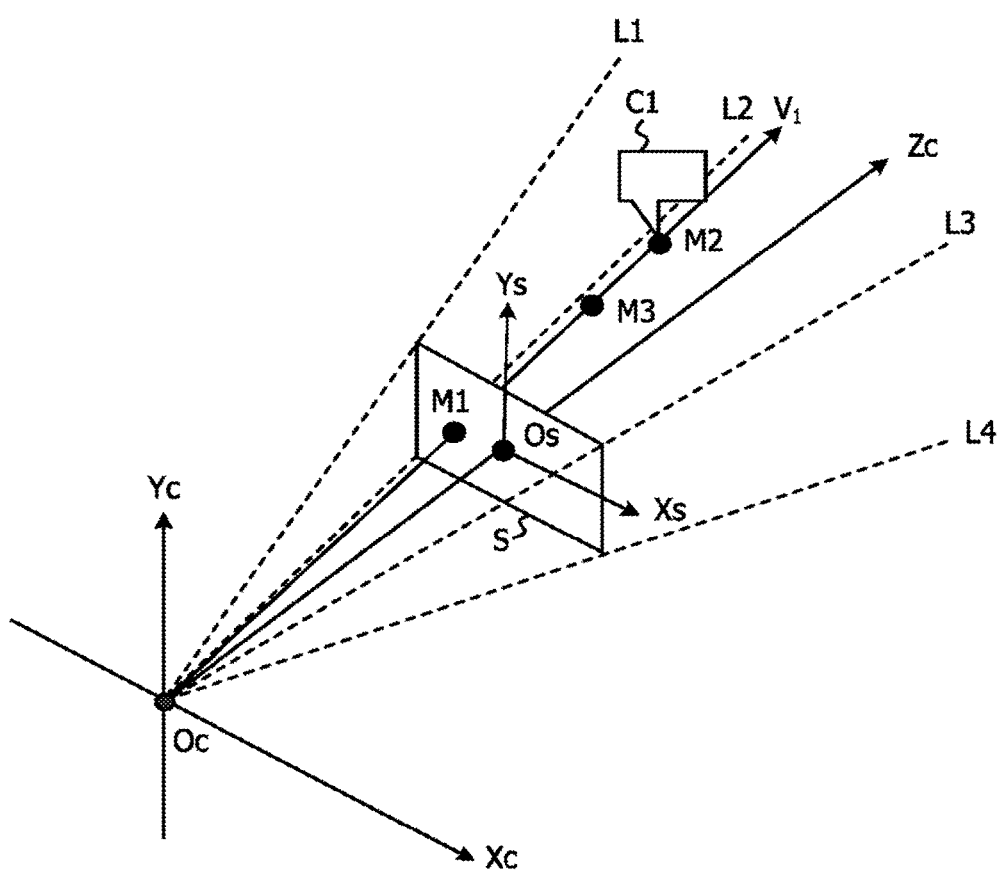
FIG. 7 is a diagram illustrating a relationship between the position of an object to be associated with the AR content and a position at which the AR content is arranged.

FIG. 7 is a diagram describing a relationship between the position of an object to be associated with the AR content and the position of the AR content to be arranged. In FIG. 7, the same parts as those illustrated in FIG. 5 are represented by the same symbols as FIG. 5. In addition, a point M2 illustrated in FIG. 7 corresponds to the point M2 illustrated in FIG. 6. The AR content C arranged at the point M2 is illustrated as an AR content C1 in FIG. 7. Thus, FIG. 7 illustrates a case where the AR content C1 exists at the point M2 located on the vector V1 when the point M2 is viewed from the camera.

It is assumed that even if the position of the AR content C1 to be arranged is set to the point M2, the object to be associated with the AR content C1 exists at a point M3 in the original real space (three-dimensional space). In this case, the point M2 at which the AR content C is arranged does not match the point M3 at which the object exists.

In this situation, if the camera and the user who views a displayed AR image are located at the position of the point Oc, the AR content C1 is superimposed and displayed in the vicinity of the object to be associated with the AR content C1 without a problem. As described above, since the AR content C1 is projected within the region S of the screen coordinate system in the AR display process, the object on the vector V1 is projected at the point M1 of the screen.

The user, however, may not view the displayed AR image at the position of the point Oc at which the authoring task is performed. Although it is considered that the position of the user who views the displayed AR image is specified, general versatility is reduced in this case.

Figure 8:
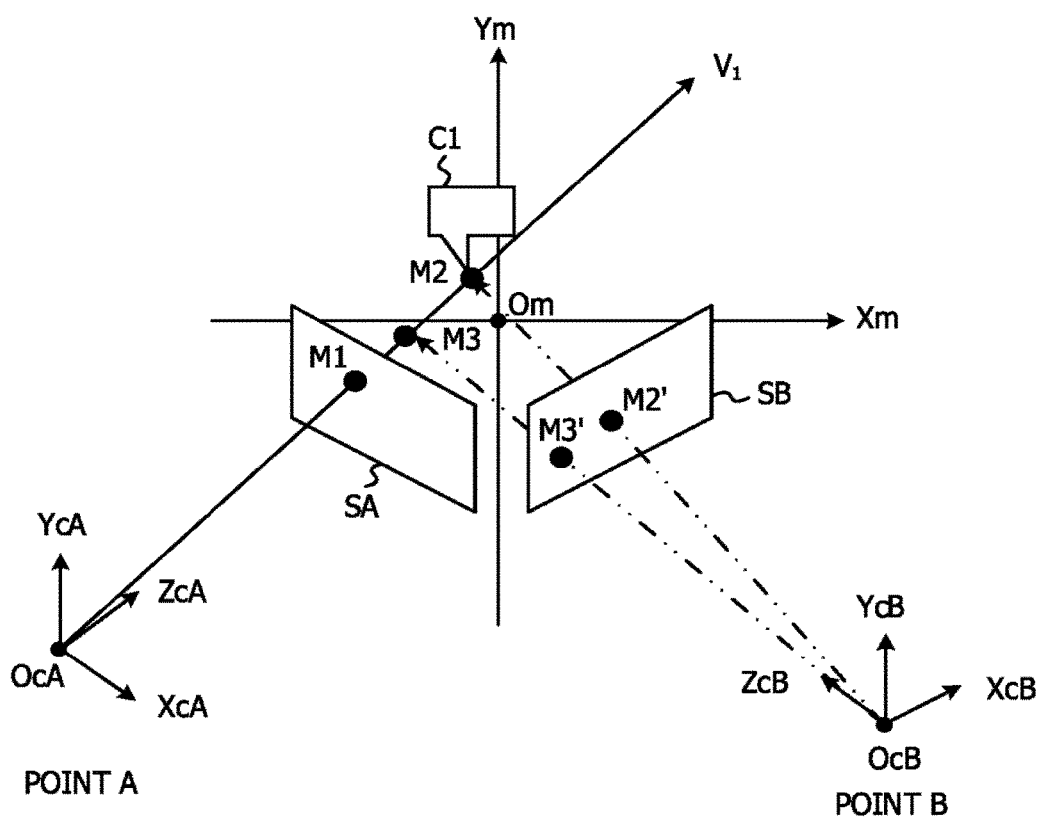
FIG. 8 is a diagram describing a virtual real space viewed from a point that is different from a point at which authoring is executed.

FIG. 8 is a diagram describing a virtual real space viewed from a point different from the point at which the authoring is performed. As illustrated in FIG. 8, the user performs the authoring task at a point A and views the displayed AR image at a point B.

In FIG. 8, coordinates (XcA, YcA, ZcA) represent a camera coordinate system when the user is located at the point A, and the origin of the camera coordinate system is OcA. In addition, a region SA is a part of a plane in the screen coordinate system when the user is located at the point A. The region SA indicates a range able to be displayed on the display. Note that XcA, YcA, ZcA, OcA, and SA correspond to Xc, Yc, Zc, Oc, and S that are illustrated in FIG. 5.

In FIG. 8, coordinates (XcB, YcB, ZcB) represent the camera coordinate system when the user is located at the point B, and the origin of the camera coordinate system is OcB. In addition, a region SB is a part of a plane in the screen coordinate system when the user is located at the point B. The region SB indicates a range able to be displayed on the display.

When the camera-equipped tablet computer images in ZcB direction after the movement of the user to the point B, the point M2 is projected at the position of a point M2' on the region SB and the AR content C1 is superimposed and displayed using the point M2 as a reference. If the object to be associated with the AR content C1 is located at the point M3, the point M3 is displayed at a point M3' on the region SB. Thus, the user who views a displayed AR image may not recognize that the AR content C1 is associated with the object existing in reality.

Figure 9:
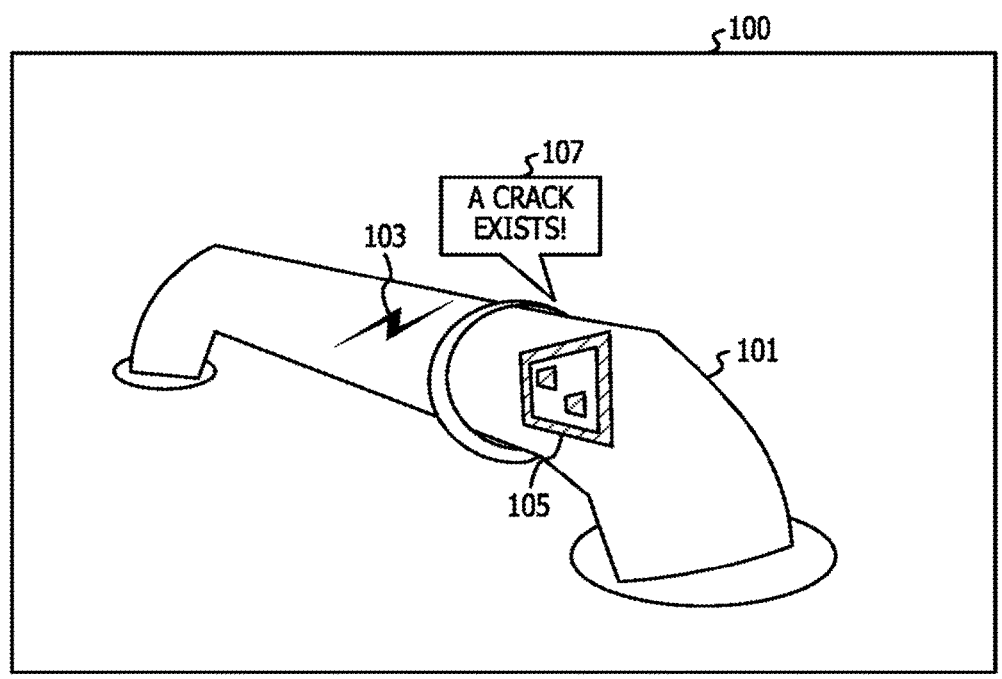
FIG. 9 is a diagram illustrating a displayed AR image acquired at a point.

FIG. 9 is a diagram illustrating the displayed AR image acquired at the point B. A crack 103 exists on a pipe 101. In addition, a marker 105 is attached to the pipe 101. When a space that includes the marker 105 is imaged at the point B, the AR content 107 associated with the marker 105 is superimposed on image data input from the camera, and the AR image 100 is displayed. It is assumed that the user specifies the point (M1) at which the crack 103 is displayed in the image acquired at the point A upon the authoring. In this case, the user generates the AR content for the purpose of drawing attention to the existence of the crack 103.

However, since the position of the crack 103 and the position of the arranged AR content 107 actually do not match each other in the authoring process, the position of the crack 103 is shifted from the position of the AR content 107 in the displayed AR image 100 acquired at the point B and including the AR content 107 projected on the AR image 100. The user who views the displayed AR image 100 may not recognize a position pointed by the AR content 107 and efficiently use the AR content 107.

As described above, since the position of the AR content to be arranged is to be accurately set on the three-dimensional space, an authoring operation (process) is used by the user at different two points in the authoring process according to the present embodiment. Hereinafter, authoring at a first point is referred to as a provisional authoring process, authoring at a second point is referred to as a main authoring process, while the provisional authoring process and the main authoring process are collectively referred to as an authoring process.

Figure 10:
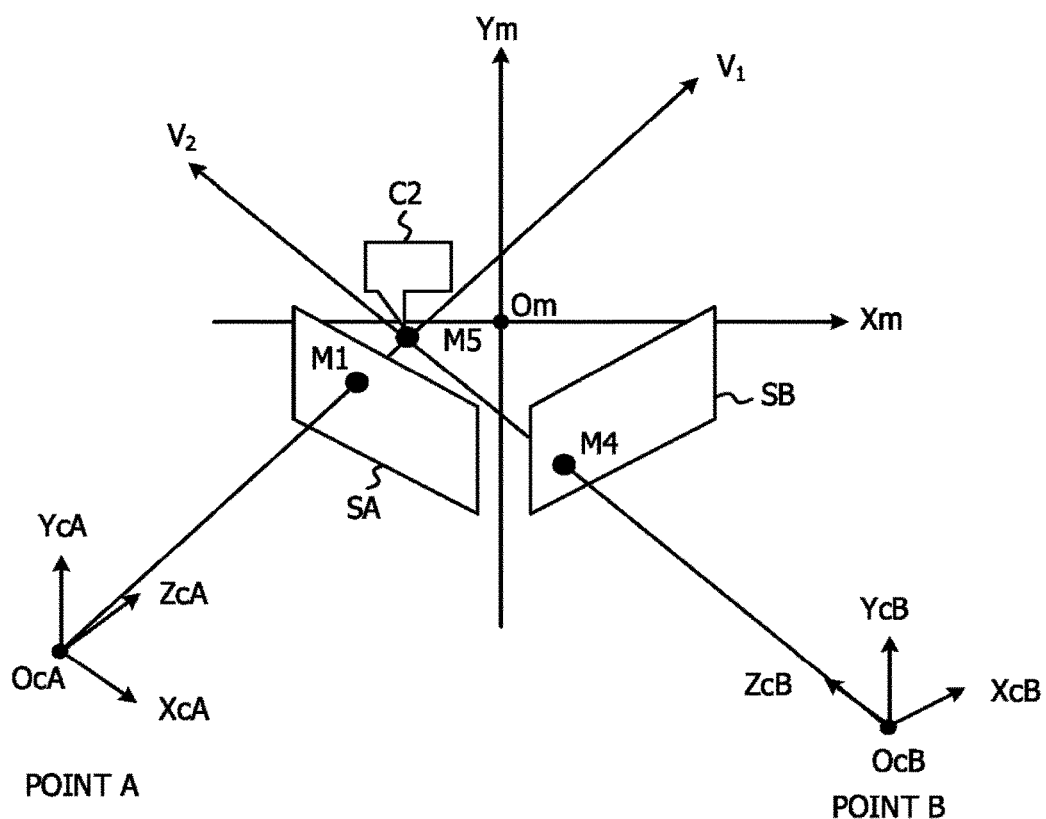
FIG. 10 is a conceptual diagram describing an authoring process according to an embodiment.

FIG. 10 is a conceptual diagram describing the authoring process according to the present embodiment. FIG. 10 assumes that the provisional authoring process is executed at the point A and that the main authoring process is executed at the point B. An example in which the same environment as FIG. 8 is used and the same parts as those illustrated in FIG. 8 are represented by the same symbols as FIG. 8 is described below, but the authoring process according to the present embodiment is not limited to this example. A minimum requirement is that the two points are located so as to ensure that an object to be associated with a marker M and an AR content is able to be imaged at the two points.

At the point A, the user views a displayed image projected on the region SA and specifies a position at which an AR content C2 is to be arranged on the displayed image. For example, the user touches the point M1 at which an object to be associated with the AR content C2 is displayed. Thus, as described above with reference to FIG. 5, the vector V1 that extends through the origin OcA of the camera coordinate system and the point M1 is specified. In this case, information of the vector V1 (or the straight line extending through the point M1 and the origin OC) is used for the authoring (main authoring process) (described later) at the second point.

In the present embodiment, the position (three-dimensional position in the marker coordinate system) of the AR content to be arranged may not be determined, but may be determined in the provisional authoring process. The position determined in the provisional authoring process, however, is updated by the main authoring process. In order to determine the position of the AR content in the provisional authoring process, a single point on the vector V1 is determined in accordance with a predetermined requirement, like the point M2 illustrated in FIG. 6, for example.

Next, the user moves to the point B. Then, at the point B, the user views a displayed image projected on the region SB and specifies a position at which the AR content C2 is to be arranged in the displayed image. For example, the user touches a point M4 at which the object to be associated with the AR content C2 is displayed. Thus, a vector V2 that extends through the origin OcB of the camera coordinate system and the point M4 is specified in the same manner as the point A.

In the present embodiment, the final position of the AR content C2 to be arranged is determined using information of the vectors V1 and V2. For example, in the present embodiment, a point M5 at which the vectors V1 and V2 intersect with each other or at which a distance between the vectors V1 and V2 is smallest is calculated. In the present embodiment, the point M5 is set as the position (positional coordinates of a standard point) of the AR content C2 to be arranged.

Coordinate values of the point M5 in the camera coordinate system may be transformed to coordinate values in the marker coordinate system, and vice versa. Here, the coordinate values of the point M5 in the camera coordinate system are transformed to the coordinate values in the marker coordinate system and stored in the storage device as the positional coordinates of the standard point of the AR content C2.

Figure 11:
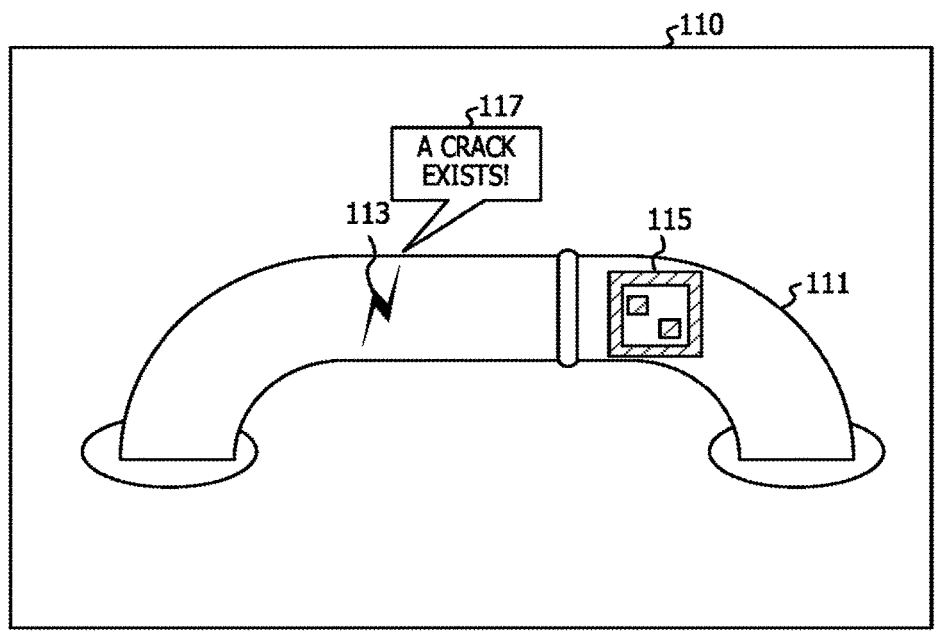
FIG. 11 is a diagram illustrating an example of a displayed AR image of an AR content whose position is determined according to the embodiment.

FIG. 11 illustrates an example of a displayed AR image including an AR content whose position is determined in the present embodiment. FIG. 11 illustrates the example in which the user views the displayed AR image at a point C that is located between the points A and B illustrated in FIG. 10 and at which the pipe 101 illustrated in FIG. 9 is installed.

A displayed AR image 110 includes a pipe 111, a crack 113, and a marker 115. The pipe 111, the crack 113, and the marker 115 are the same as the pipe 101, the crack 103, and the marker 105 that are illustrated in FIG. 9. In the displayed AR image 110, an AR content 117 is superimposed and displayed while pointing the crack 113.

According to the present embodiment, a three-dimensional position at which the crack 113 exists is specified as the position of the AR content to be arranged. Thus, in the present embodiment, even if the AR display process is executed on images acquired at various points such as the points A, B, and C, the AR content 117 is displayed near the crack in the real space.

In the above description, the point M5 at which the distance between the vector V1 and the vector V2 is smallest is determined as the final position of the AR content. The final position, however, is not limited to this. For example, a point that is located on the vector 1 and closest to the vector V2 among points on the vector 1, or a point that is located on the vector 2 and closest to the vector V1 among points on the vector V2, may be specified as the final position. In this manner, the final position may be determined while being limited to any of the two points located on the specified vectors.

Exemplary Configuration of System

Figure 12:
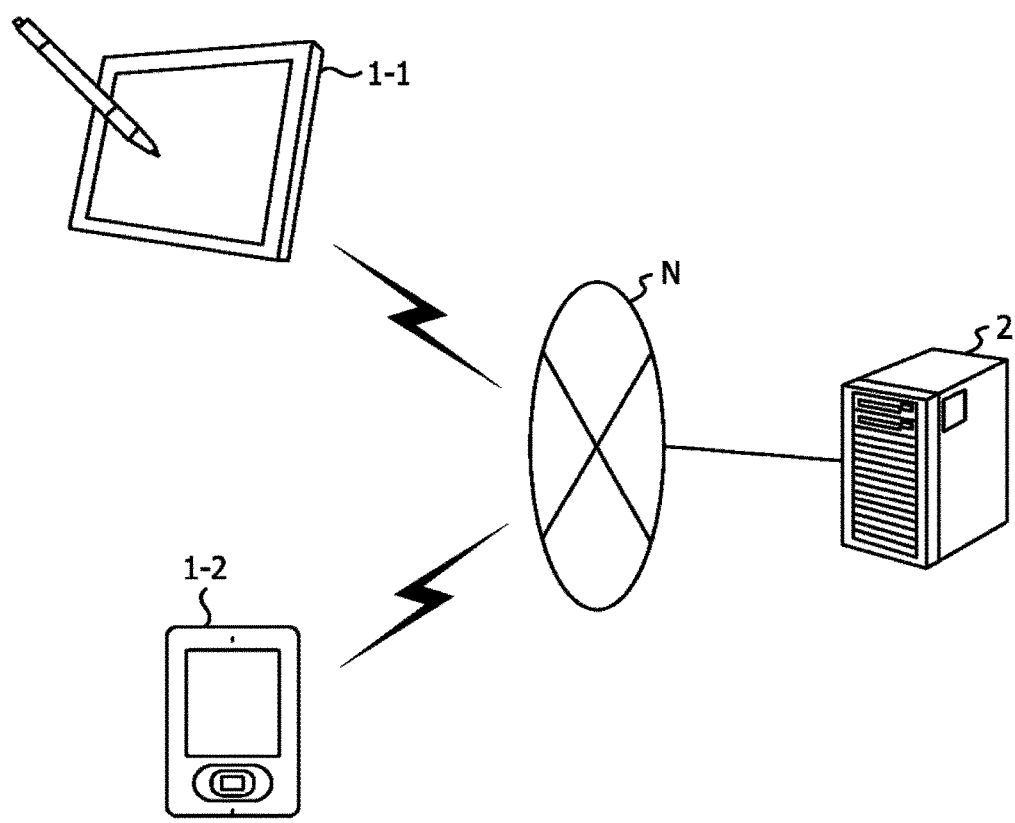
FIG. 12 is a diagram illustrating a system configuration according to the embodiment.

FIG. 12 is a diagram illustrating a configuration of a system according to the present embodiment. In an example illustrated in FIG. 12, a communication terminal 1-1 and a communication terminal 1-2 are described as examples of display devices configured to the AR display process and the authoring process. Hereinafter, the communication terminal 1-1 and the communication terminal 1-2 are collectively referred to as a display device 1. The display device 1 communicates with a managing device 2 through a network N.

The display device 1 is, for example, a computer that includes an image capturing device such as a camera and a display and is a tablet PC, a smartphone, or the like. The managing device 2 is, for example, a server computer and is configured to manage the display device 1. The network N is the Internet, for example. The system according to the present embodiment includes the display device 1 and the managing device 2.

The display device 1 executes the AR display process. The AR display process is described above with reference to FIGS. 1 to 4, for example. The display device 1 executes the authoring process. The authoring process is described above with reference to FIG. 10, for example.

The managing device 2 stores AR content information and template information. When the authoring process is executed by the display device 1, the managing device 2 acquires the AR content information generated by the authoring process from the display device 1 and causes the AR content information to be stored in the storage device. When the AR display process is executed by the display device 1, the managing device 2 provides the AR content information and the template information to the display device 1.

The AR content information is information on an AR content to be displayed. The template information is information in which the shape, design, and the like of a template are defined when an object to be used as the AR content C is prepared as the template.

Exemplary Functional Configuration

Figure 13:
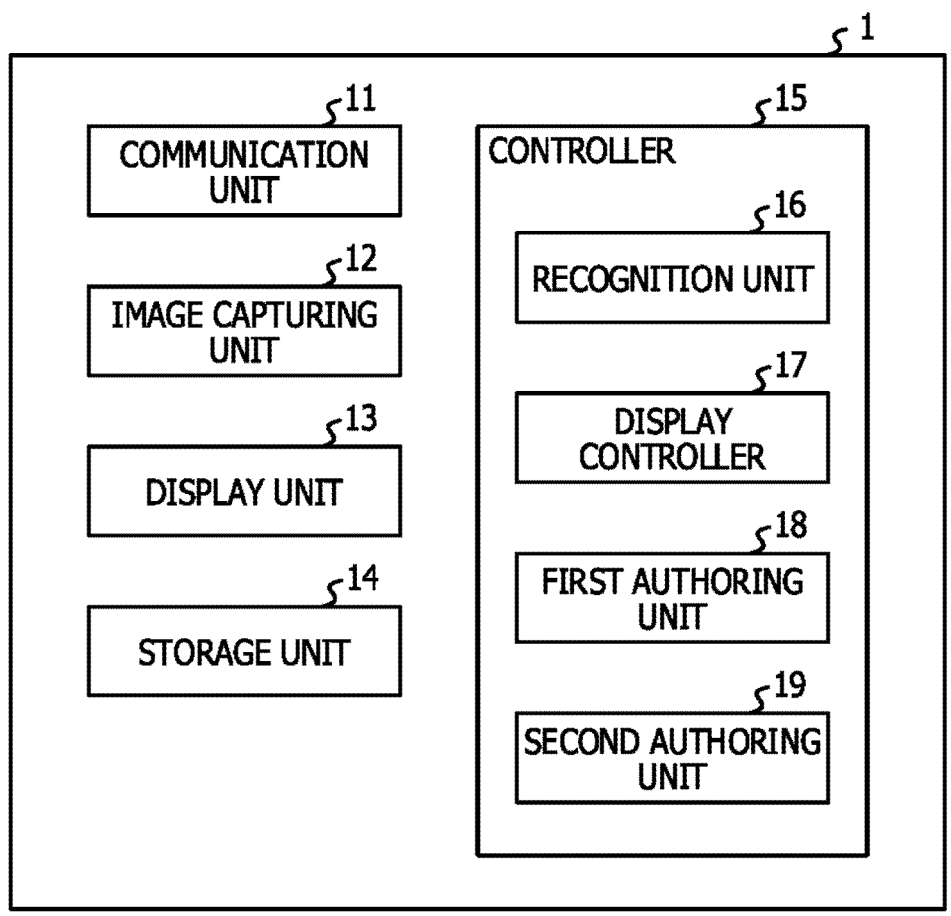
FIG. 13 is a functional block diagram of a display device.

FIG. 13 is a functional block diagram of the display device. The display device 1 includes a communication unit 11, an image capturing unit 12, a display unit 13, a storage unit 14, and a controller 15.

The communication unit 11 communicates with another computer. For example, the communication unit 11 transmits AR content information generated by the authoring process to the managing device 2. In addition, the communication unit 11 receives AR content information generated in the past and template information from the managing device 2 for the AR display process.

The image capturing unit 12 executes imaging at certain frame intervals and generates image data. Then, the image capturing unit 12 causes the image data to be input to the controller 15. In addition, the image capturing unit 12 causes an acquired image to be stored in the storage unit 14.

The display unit 13 displays image data of various types that has been acquired from the controller 15. The image data of the various types includes image data acquired by the image capturing unit 12 and synthesized image data generated by the controller 15.

The storage unit 14 stores information of various types under control by the controller 15. The storage unit 14 stores image data. For example, a buffer for storing a plurality of images is included in the storage unit 14, and an image acquired by the image capturing unit 12 is stored in the buffer. For example, the buffer included in the storage unit 14 is a display buffer for storing images to be displayed by the display unit 13. The images stored in the display buffer are sequentially displayed by the display unit 13.

In addition, the storage unit 14 stores AR content information, template information, and provisional AR content information. The provisional AR content information presents a direction (or a straight line) specified in the provisional authoring process to the user. For example, as illustrated in FIG. 10, it is assumed that the user specifies the point M1 at the point A, moves to the point B after the specifying, and specifies a point again. In this case, at the point B, a provisional AR content for the vector V1 is displayed on the display unit 13 of the display device 1. Even the provisional AR content is displayed in the same process as the process executed on an AR content.

By providing a guide line corresponding to the vector V1 to the user, the user may view the vector V1 specified in the provisional authoring process from the side at the point B. The provisional AR content assists the user in specifying any of points located in a direction specified in the provisional authoring process.

The controller 15 controls various processes of the overall display device 1. For example, the controller 15 executes a process of recognizing a marker M, the AR display process, the provisional authoring process, and the main authoring process. The controller 15 includes a recognition unit 16, a display controller 17, a first authoring unit 18, and a second authoring unit 19.

The recognition unit 16 executes the object recognition on input image data. Specifically, the recognition unit 16 uses a template based on the shape of the marker M and provided for the object recognition to determine whether or not image data of the marker M is included in the input image data. If the recognition unit 16 determines that the image data of the marker M is not included in the input image data, the recognition unit 16 outputs information indicating a failure of the recognition to the display controller 17.

If the image data of the marker M is included in the input image data, the recognition unit 16 generates region information indicating a region of the marker M in the input image data. The shape of the marker M appearing in the image data may be detected from the region information. For example, the region information is coordinate values of four corners forming the marker M. The region information is input to the display controller 17 described later.

In addition, the recognition unit 16 calculates positional coordinates and rotational coordinates of the marker M based on the region information. The positional coordinates and rotational coordinates of the marker M are values in the camera coordinate system. The recognition unit 16 outputs the calculated positional coordinates and the calculated rotational coordinates to the display controller 17.

If the image data of the marker M is included in the input image data, the recognition unit 16 acquires identification information identifying the marker M from the design of the marker M. For example, a marker ID is acquired. For example, the unique marker ID is acquired from the arrangement of a white part and black part of the marker M, like a two-dimensional barcode. As a method for acquiring the marker ID, another known acquisition method may be used.

The shape of the marker M is the same as a plurality of markers M. The designs of the markers M are different from each other. Thus, the plurality of markers M whose designs are different from each other is prepared, and different AR contents C may be associated with the markers M, respectively.

If AR content information and provisional AR content information that correspond to the marker ID exist, the display controller 17 generates AR image data using the positional coordinates received from the recognition unit 16 and the rotational coordinates received from the recognition unit 16.

FIG. 14 illustrates an exemplary configuration of a data table storing the AR content information. The AR content information includes at least an AR content ID, positional information, and rotational information. In addition, the AR content information may include magnification information, a template ID, a marker ID, and additional information. The positional information included in the AR content information represents a three-dimensional position set in the authoring process according to the present embodiment.

In the data table, the AR content ID, the positional information of the AR content C in the marker coordinate system, and the rotational information of the AR content C in the marker coordinate system are associated with each other and stored. The AR content ID is identification information uniquely identifying the AR content C. The positional information is used to specify the position of the AR content C corresponding to the marker M. For example, the positional information is positional coordinates (Xm, Ym, Zm) of a standard point included in the AR content C. The rotational information is used to specify a rotation of the AR content C with respect to the marker M. For example, the rotational information is rotational coordinates (Pm, Qm, Rm) of the AR content C with respect to the marker M.

In the data table, the template ID and the magnification information are stored. The template ID is identification information identifying a template used for the AR content C. The magnification information is information of a magnification D used when the template is used for the AR content C. For example, the magnification information is magnifications (Jx, Jy, Jz) to be used to enlarge or reduce the AR content C in the axial directions x, y, and z.

In addition, when the AR content C is to be switched to another AR content C to be displayed based on the identification information of the recognized marker M, the marker IDs of the markers associated with the AR contents C are stored in the data table. If the AR content C is to be switched to another AR content C for the same marker M based on attribute information of users, the marker IDs and information identifying attributes of the users are stored in the data table for the AR contents C.

In the data table, the additional information may be stored. As the additional information, information of texts to be drawn in the AR contents C is stored. In an example of an AR content ID "C1", a text "A crack exists!" is drawn in an interested AR content C.

FIG. 15 illustrates an exemplary configuration of a data table storing template information. The template information includes identification information (template ID) of a template, information T1 of coordinates of corners forming the template, configuration information (specifying the orders of the corners and a texture ID) T2 of planes forming the template.

The orders of the corners represent the orders of the corners forming the planes. The texture ID represents identification information of a texture to be mapped to the planes. A standard point of the template is, for example, a 0-th corner. The shape and design of a three-dimensional model is defined by the information represented in the template information table.

The display controller 17 incrementally increases or reduces each of corner coordinates defined in the template "T1" illustrated in FIG. 15 in Xm, Ym, and Zm directions for the AR content C with the AR content ID "C1" illustrated in FIG. 14. Then, the display controller 17 rotates the corner coordinates defined in the template "T1" with respect to rotational coordinates (0, 0, 0) and translates the corner coordinates defined in the template "T1" based on positional coordinates (20, 25, 10).

Then, the display controller 17 uses the transformation matrix T to transform coordinates of points of the AR content C from the marker coordinate system to the camera coordinate system. In addition, the display controller 17 uses the aforementioned Equations 1 and 2 to transform the coordinates from the camera coordinate system to the screen coordinate system. Furthermore, the display controller 17 maps the texture defined in the texture information and the additional information defined in the AR content information to the planes forming the AR content C and thereby generates an image (image data) of the AR content C to be imposed and displayed.

In addition, if provisional AR content information corresponding to the marker ID received from the recognition unit 16 exists, the display controller 17 superimposes and displays the provisional AR content by the same process.

Return to FIG. 13. The first authoring unit 18 executes the provisional authoring process. The process to be executed by the first authoring unit 18 is described in detail with reference to FIG. 10. The first authoring unit 18 acquires the coordinate values (Xs1, Ys1), included in the screen coordinate system, of the point M1 (point on the display unit 13) specified by the user on the image data displayed on the display unit 13. The coordinate values are input to the first authoring unit 18 from the display unit 13.

The first authoring unit 18 transforms the coordinate values of the point M1 in the screen coordinate system to coordinate values (Xc1, Yc1, Zc1) of the camera coordinate system. The coordinate values Xc1 and Yc1 are calculated by substituting Xs1 into Xs of the aforementioned Equation 1, substituting Ys1 into Ys of the aforementioned Equation 2, and substituting Zc_screen into Zc. Zc1 is Zc_screen that represents a position in Zc direction at which the screen that is the projection plane is set.

Next, the coordinate values (Xc1, Yc1, Zc1) of the point M1 in the camera coordinate system are transformed to coordinate values (Xm1, Ym1, Zc1) of the marker coordinate system. For the transformation, the inverse of the transformation matrix T is used. The transformation matrix T is generated based on input from the recognition unit 16 in the same manner as the display controller 17.

Next, the first authoring unit 18 transforms the origin OcA (0, 0, 0) of the camera coordinate system to coordinate values (Xmc, Ymc, Zmc) of the marker coordinate system. For the transformation, the inverse of the transformation matrix T is used in the same manner as the transformation of the coordinates of the point M1. The origin OcA of the camera coordinate system is treated as an imaging position at which the displayed image data is acquired.

Then, the first authoring unit 18 uses the coordinate values (Xm1, Ym1, Zm1) of the point M1 in the marker coordinate system and the coordinate values (Xmc, Ymc, Zmc) of the origin OcA in the marker coordinate system to generate information of a straight line extending through the two points. Specifically, the first authoring unit 18 generates the information of the straight line extending through the point specified by the user and the imaging position. For example, equations of the straight line are obtained by the following Equations 3 and 4. Equation 3 represents that an arbitrary point on the straight line R(t) is obtained by operating an argument t. The vector V1 illustrated in 10 corresponds to a vector V of Equation 4.

$$V = \frac{(Xm1 - Xmc \cdot Ym1 - Ymc \cdot Zm1 - Zmc)}{\sqrt{(Xm1 - Xmc)^2 + (Ym1 - Ymc)^2 + (Zm1 - Zmc)^2}} \quad \text{(Equation 4)}$$

Next, the first authoring unit 18 obtains positional information (coordinate values in the marker coordinate system) of a start point and positional information (coordinate values in the marker coordinate system) of an end point by substituting set first and second values into t of R(t). The first value and the second value are set in advance based on the length of the guide line to be provided.

Then, the first authoring unit 18 generates provisional AR content information including the positional information of the start point and the positional information of the end point. Then, the first authoring unit 18 causes the generated provisional AR content information to be stored in the storage unit 14. The provisional AR content information is used to draw the vector V1 illustrated in FIG. 10 as an AR content.

FIG. 16 illustrates an exemplary configuration of a data table storing the provisional AR content information. The provisional AR content information includes at least a provisional AR content ID, an AR content ID, the positional information of the start point, and the positional information of the end point. The provisional AR content ID is information identifying the provisional AR content. The AR content ID is the ID of an AR content whose position is determined by the provisional authoring from which the provisional AR content is derived. Specifically, the ID of the AR content that is being subjected to the authoring is stored. The provisional AR content information does not include rotational information.

The positional information of the start point is the coordinate values (in the marker coordinate system) obtained when the first value is substituted into t of the straight line R(t). The positional information of the end point is the coordinate values (in the marker coordinate system) obtained when the second value is substituted into t of the straight line R(t).

In addition, the provisional AR content information may include magnification information, a template ID, a marker ID, and additional information. In the example illustrated in FIG. 16, a template to be used to draw a straight line is selected as the template ID. Although a data configuration of the template information is the same as the configuration illustrated in FIG. 15, a group of points separated by a predetermined distance from the start point and the end point may be defined and a template formed in a polygonal shape such as a triangular prism or a cylindrical shape may be prepared in order to draw a straight line (or a vector) having a certain width.

Then, the first authoring unit 18 may arrange the AR content at any of the points on the straight line R(t). For example, the AR content is arranged at a point at which the straight line R(t) intersects with the Xm-Ym plane in the marker coordinate system. In this case, the first authoring unit 18 causes the AR content information to be stored in the storage unit 14. The AR content information stored by the provisional authoring process is updated by the subsequent main authoring process.

Return to FIG. 13. The second authoring unit 19 executes the main authoring process. The second authoring unit 19 uses the point (point M4 illustrated in FIG. 10) newly specified by the user on the screen and the straight line information (V1) generated in the provisional authoring process to identify the position (M5) of the AR content to be arranged. The position of the AR content to be arranged is coordinate values in the marker coordinate system.

For example, in the main authoring process, the guide line and the AR content arranged at a position on the straight line R(t) are displayed based on the provisional AR content information generated in the provisional authoring process and the AR content information. The user drags the AR content along the guide line and specifies the position (M4) that is located on the image acquired at the point B and at which the AR content is to be arranged.

The second authoring unit 19 transforms the point M4 specified by the user from coordinate values (Xs4, Ys4) of the screen coordinate system to coordinate values (Xc4, Yc4, Zc4) of the camera coordinate system. Zc4 is Zc_screen. Next, the second authoring unit 19 transforms the coordinates (Xc4, Yc4, Zc4) of the point M4 to coordinate values (Xm4, Ym4, Zm4) of the marker coordinate system.

Then, the first authoring unit 18 transforms the origin OcB (0, 0, 0) of the camera coordinate system to coordinate values (Xmc', Ymc', Zmc') of the marker coordinate system. The transformation processes are the same as or similar to the transformation processes included in the provisional authoring process. The second authoring unit 19 uses Equations 3 and 4 to calculate a straight line R'(t) extending through the point M4 and the origin OcB and generates information of the straight line in the same manner as the provisional authoring process.

Then, the second authoring unit 19 uses the straight line information R(t) generated in the provisional authoring process and the newly generated straight line information R'(t) to identify the point M5 corresponding to the position specified by the user. For example, a position at which the two straight lines indicated by the information of the two straight lines intersect with each other, or a position at which a distance between the two straight lines is smallest, is identified. Alternatively, a position that is located on the straight line indicated by the straight line information generated in the provisional authoring process and at which the distance between the two straight lines is smallest may be identified.

When the display device 1 is specified the point M4, the second authoring unit 19 may specify the point M4 from among only points located on the provisional AR content displayed by the display controller 17. Specifically, when the user specifies a point other than points on the guide line, the display device 1 may provide an alarm, request respecifying, and is specified again. In this case, the two straight lines indicated by the information of the two straight lines intersect with each other at the point M5.

Next, the second authoring unit 19 searches the data table storing AR content information using the AR content ID included in the provisional AR content information as a key and updates positional information included in a corresponding record to positional information (coordinate values of the marker coordinate system) corresponding to the identified position.

Flowchart

Figure 17:
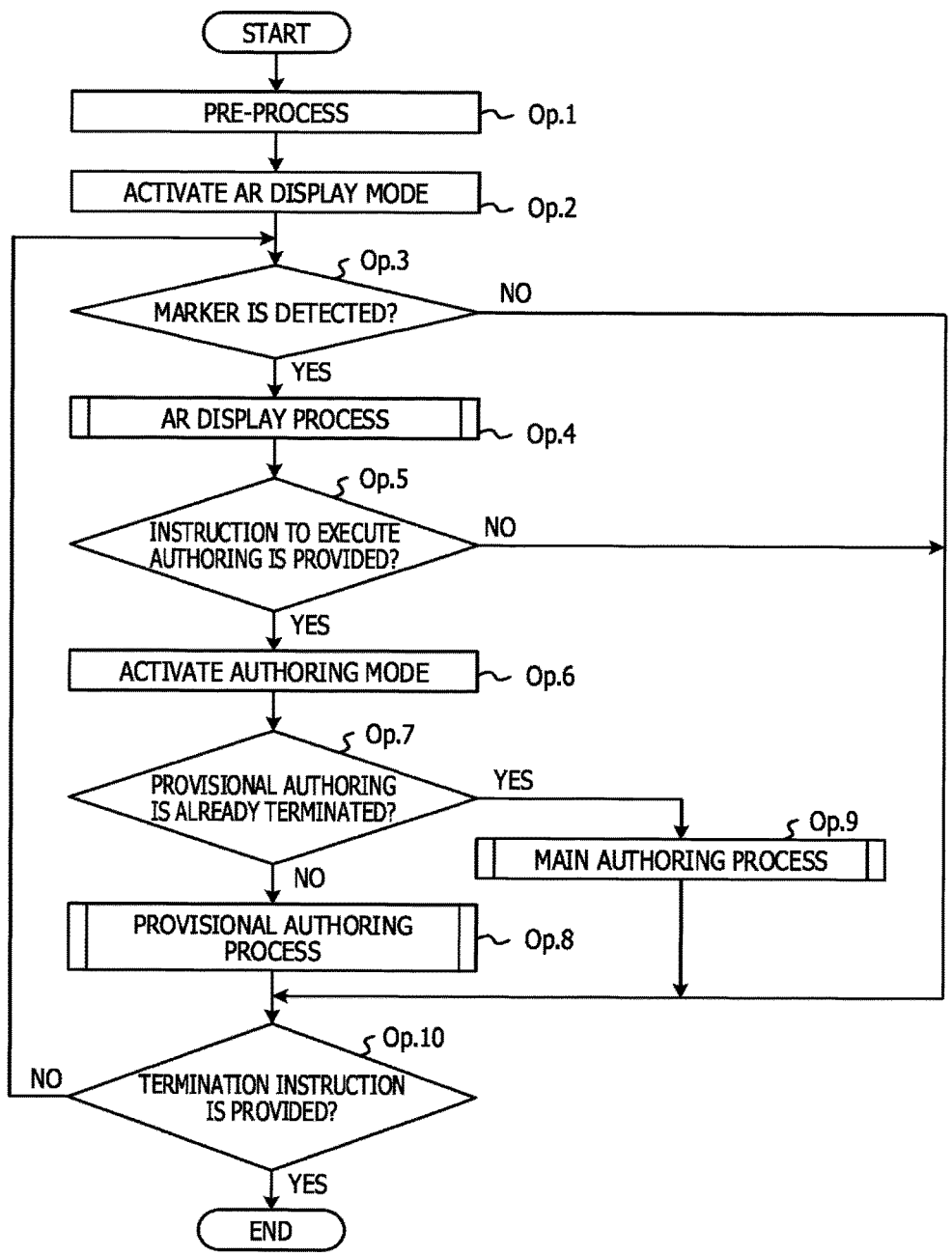
FIG. 17 is a flowchart of the authoring process according to the embodiment.

FIG. 17 is a flowchart of the authoring process according to the present embodiment. Although the present embodiment describes a case where the AR display process is included in the authoring process, the AR display process may be executed separately from the authoring process. In addition, the following assumes that the provisional authoring process is executed at the point A and that the main authoring process is executed at the point B, like FIG. 10.

When the AR program is activated, the controller 15 executes a pre-process (Op. 1). In the pre-process, template information is acquired from the managing device 2. If AR content information generated in the past exists, the AR content information is acquired from the managing device 2.

Next, the controller 15 provides an instruction to activate an AR display mode (Op. 2). For example, the controller 15 causes the image capturing unit 12 to start imaging at predetermined time intervals and causes the recognition unit 16 to start a process of detecting a marker M on acquired image data. In addition, the controller 15 causes the display unit 13 to display the image data acquired by the image capturing unit 12.

Next, the recognition unit 16 acquires image data stored in the buffer included in the storage unit 14 and determines whether or not image data of the marker M is included in the acquired image data (Op. 3). If the recognition unit 16 detects the marker M (YES in Op. 3), the AR display process is executed. If the marker M is detected, the recognition unit 16 causes region information of a region corresponding to the marker M to be input to the display controller 17. In addition, the recognition unit 16 reads a marker ID of the marker M and causes the read marker ID to be input to the display controller 17. The recognition unit 16 causes the read marker ID to be temporarily stored in the storage unit 14. The stored marker ID is referenced upon the generation of AR content information and the generation of provisional AR content information.

On the other hand, if the recognition unit 16 does not detect the marker M (No in Op. 3), the controller 15 determines whether or not an instruction to terminate the program is provided (Op. 10). If the instruction to terminate the program is not provided (No in Op. 10), the controller 15 causes the process to return to Op. 3 and determines whether or not the marker M is detected.

Figure 18:
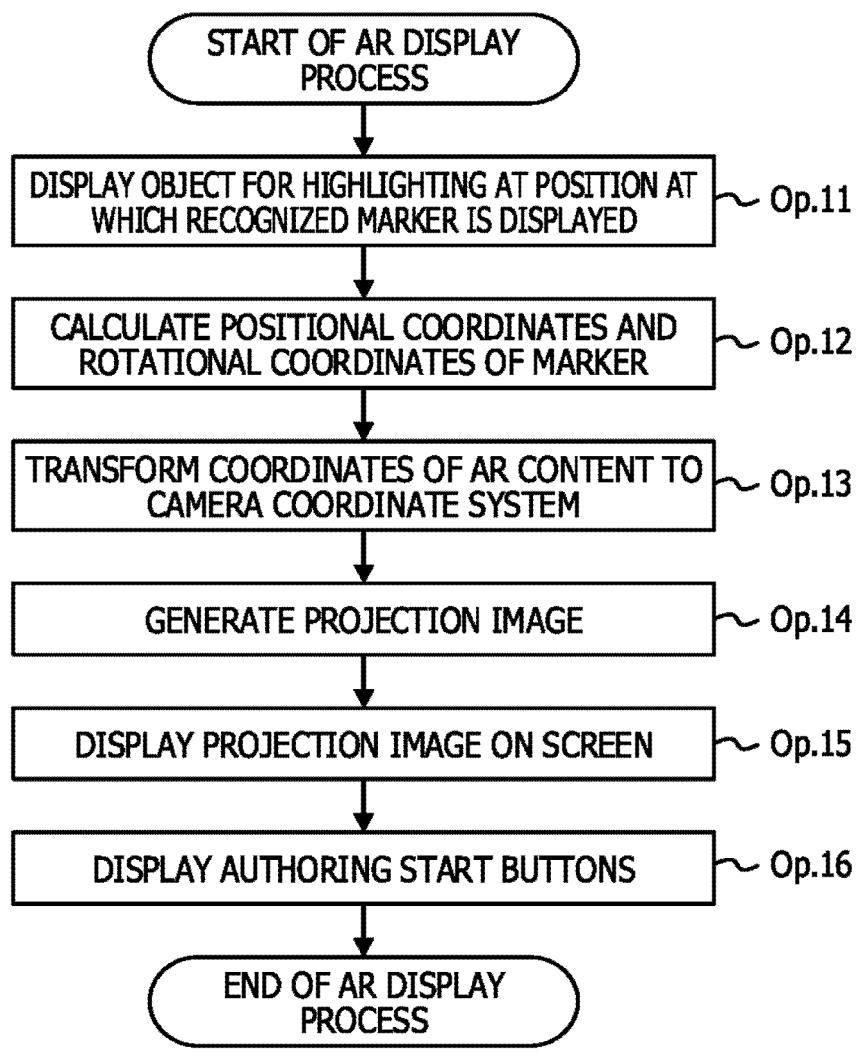
FIG. 18 is a flowchart of an AR display process.

FIG. 18 is a flowchart of the AR display process. The AR display process is executed if AR content information and provisional content information that are associated with the recognized marker M exist in the storage unit 14. If the AR content information and the like do not exist, the AR display process is omitted.

When the AR display process is started, the display controller 17 displays (highlight display), based on the region information received from the recognition unit 16, an object for highlighting the existence of the marker M at a position at which the recognized marker M is displayed in the display screen of the display unit 13 (Op. 11). The highlight display is executed, for example, by displaying a square frame at the position at which the marker M is displayed. The highlight display plays a role of notifying the user that the marker M has been detected.

Next, the recognition unit 16 calculates positional coordinates and rotational coordinates of the marker M (Op. 12). For example, the recognition unit 16 calculates the positional coordinates and rotational coordinates of the marker M based on the region information of the marker M detected in Op. 3. The calculated positional coordinates and the calculated rotational coordinates are coordinate values in the camera coordinate system.

Then, the display controller 17 transforms, based on the AR content information and the provisional AR content information, coordinates of points of the AR content C defined in the template information from the marker coordinate system to the camera coordinate system (Op. 13). Specifically, the display controller 17 searches, from the AR content information registered in the data table for AR content information, AR content information including the marker ID of the recognized marker M. If the interested AR content information exists, the display controller 17 acquires the AR content information from the data table. Then, the display controller 17 reads a template information table corresponding to a template ID included in the acquired AR content information. Then, the display controller 17 executes the model-view transformation. The same applies the provisional AR content information.

The display controller 17 transforms the coordinates of the points of the AR content from the camera coordinate system to the screen coordinate system and thereby generates a projection image of the AR content (Op. 14). After generating the projection image, the display controller 17 superimposes and displays the projection image on an image of the acquired image data stored in the display buffer.

Next, the display controller 17 causes the display unit 13 to display authoring start buttons (Op. 16). In this case, as the authoring start buttons, a provisional authoring start button and a main authoring start button are displayed. The user presses any of the buttons so as to start the authoring. When the aforementioned process is terminated, the controller 15 terminates the AR display process illustrated in FIG. 18 and causes the process to return to the authoring process illustrated in FIG. 17.

Subsequently, the controller 15 determines whether or not the pressing of any of the authoring start buttons is detected within a predetermined time period after the display of the authoring start buttons (Op. 5). If the pressing of any of the authoring start button is detected (YES in Op. 5), the controller 15 activates an authoring mode. In response to the activation of the authoring mode, a video image display mode in which image data acquired by the image capturing unit 12 is sequentially displayed is switched to a still image display mode in which image data that is displayed on the display unit 13 at the time of the pressing of any of the authoring start buttons is displayed.

Next, the controller 15 determines whether or not the provisional authoring is already terminated (Op. 7). For example, if provisional AR content information that includes the marker ID of the recognized marker M exists, the controller 15 determines that the provisional authoring is already terminated. Alternatively, if the main authoring start button is pressed, the controller 15 may determine that the provisional authoring is already terminated.

If the provisional authoring is not terminated (NO in Op. 7), the first authoring unit 18 executes the provisional authoring process (in Op. 8). If the pressing of the authoring start button is not detected within the predetermined time period (NO in Op. 5), the controller 15 determines whether or not the instruction to terminate the program is provided (in Op. 10).

Figure 19:
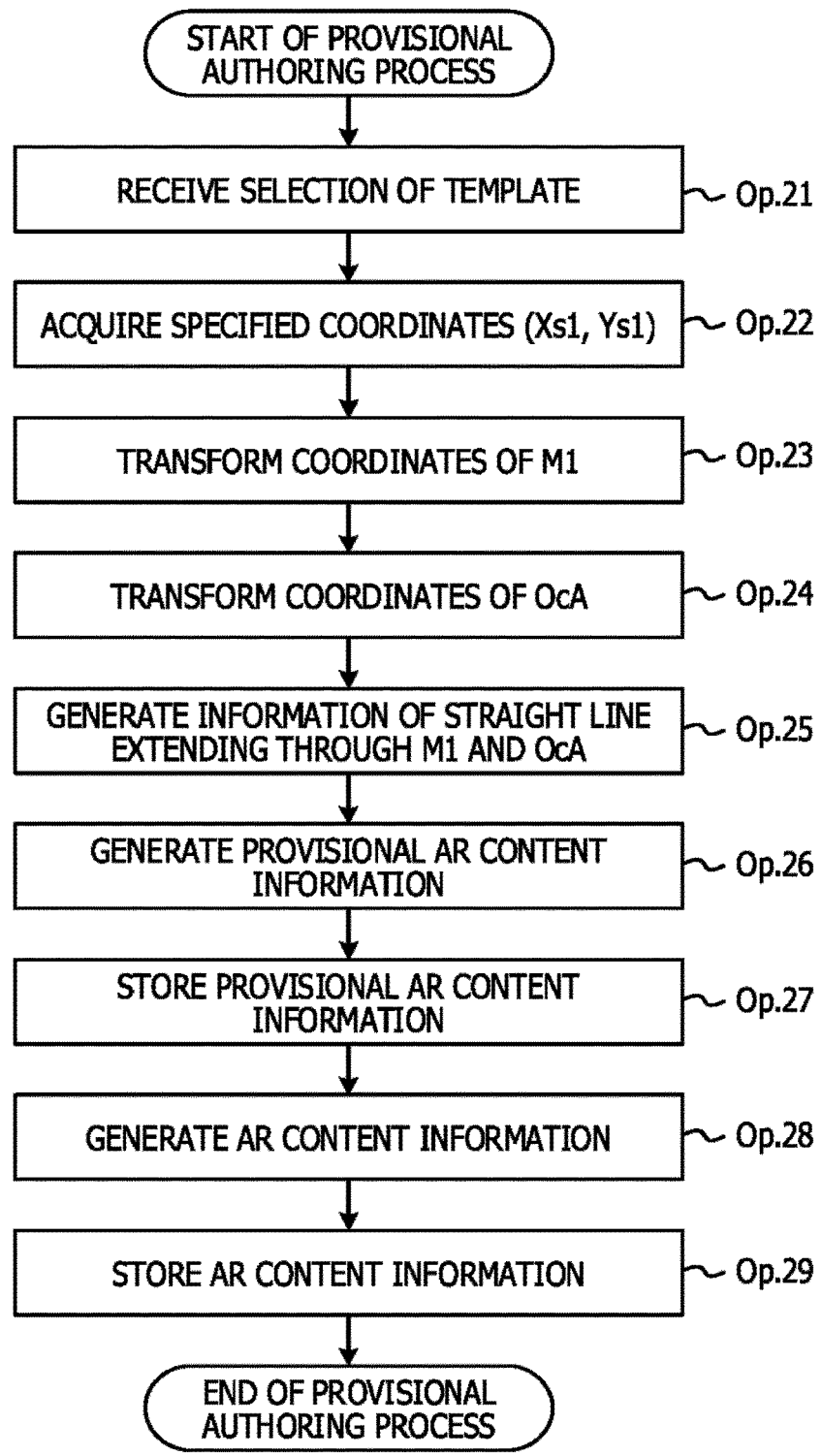
FIG. 19 is a flowchart of a provisional authoring process.

FIG. 19 is a flowchart of the provisional authoring process. The first authoring unit 18 displays a screen for selecting a template and receives the selection of a template (in Op. 21).

Figure 21:
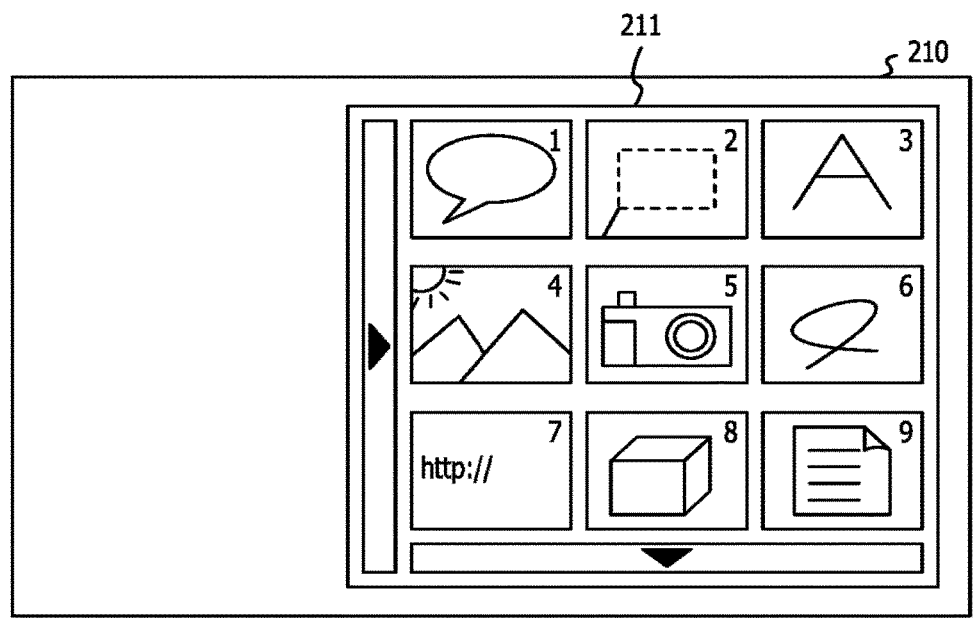
FIG. 21 is a diagram illustrating an example of a screen for selection of a template.

FIG. 21 illustrates an example of the screen for selecting a template. For example, a template display region 211 is superimposed and displayed on a screen 210 displaying image data in the still image display mode. The user selects, from among templates displayed in the template display region 211, an object to be displayed as an AR content. A template ID corresponding to the selected object is acquired and used as AR content information.

Next, the first authoring unit 18 acquires the position (Xs1, Ys1) specified by the user (Op. 22). The first authoring unit 18 transforms the point M1 specified by the user through coordinate values of the camera coordinate system to coordinate values of the marker coordinate system (in Op. 23).

In addition, the first authoring unit 18 transforms the origin OcA, corresponding to an imaging position, of the camera coordinate system to coordinate values of the marker coordinate system (in Op. 24). Methods for the transformation executed in Op. 23 and Op. 24 are described above. The order that Op. 23 is executed and the order that Op. 24 is executed may be switched with each other.

Then, straight line information that indicates a straight line extending through the position M1 specified by the user and the origin OcA, corresponding to the imaging position, of the camera coordinate system is generated (in Op. 25). The straight line is calculated according to the aforementioned Equations 3 and 4. In addition, coordinate values of the marker coordinate system are provided to the straight line.

The first authoring unit 18 generates, based on the straight line information, provisional AR content information in order to display in a direction specified by the user using an AR content (in Op. 26). Then, the first authoring unit 18 causes the generated provisional AR content information to be stored in the data table (illustrated in FIG. 16) (in Op. 27).

As described above, the provisional AR content information includes positional information (marker coordinate system) of a start point, positional information (marker coordinate system) of an end point, an AR content ID, a marker ID, a template ID of a template representing the straight line, and the like. As the AR content ID, an AR content ID that is to be provided to AR content information to be generated in a subsequent process is set.

Next, the first authoring unit 18 uses the straight line information to generate the AR content information (in Op. 28). Then, the first authoring unit 18 causes the generated AR content information to be stored in the data table (illustrated in FIG. 14) (in Op. 29). After the termination of Op. 29, the controller 15 may output a message instructing the user to change the imaging position.

The AR content information includes the AR content ID, the marker ID, the template ID selected in Op. 21, the positional information, and the like. The positional information included in the AR content information generated in Op. 28 is updated in the subsequent main authoring process. For example, a position at which the straight line intersects with the Xm-Ym plane of the marker coordinate system is set as the position of the AR content to be arranged.

Return to FIG. 17. If the termination instruction is not received after the termination of the provisional authoring process (NO in Op. 10), the controller 15 releases the still image display mode and executes processes of Op. 3 and later after restoration to the video image display mode. During the processes of Op. 3 and later, the user moves in order to change the imaging position. In this case, the user moves to a position at which regions in which the marker M and the AR content are to be arranged are able to be imaged.

If a marker M is newly detected after the termination of the provisional authoring process (YES in Op. 3) and the AR display process is executed (in Op. 4), the provisional AR content is superimposed and displayed on image data displayed in the video image display mode.

Figure 22:
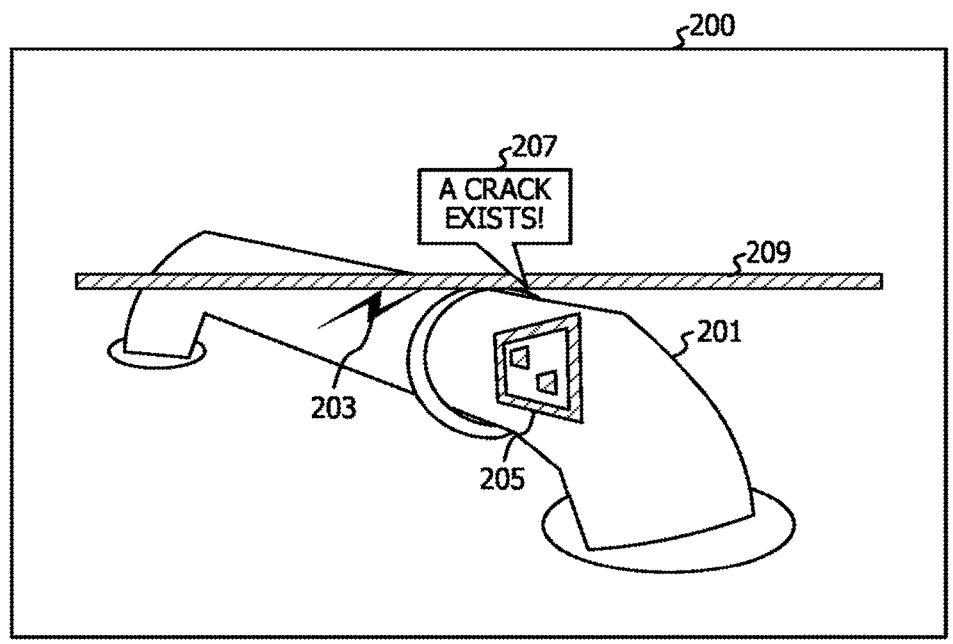
FIG. 22 is a diagram illustrating an example of a displayed AR image in which a provisional AR content is displayed.

FIG. 22 illustrates an example of a displayed AR image on which the provisional AR content is displayed. In a displayed AR image 200, a pipe 201, a crack 203, and a marker 205 that exist in reality are displayed. In addition, in the displayed AR image 200, a provisional AR content 209 generated in the provisional authoring process and an AR content 207 are displayed. The user specifies a position at which the AR content 207 is to be arranged on the provisional AR content 203 while confirming that the position of the AR content 207 to be arranged is separated from the crack 203.

By this operation, the position of the AR content 207 to be arranged may be specified on a line (provisional AR content 203) extending in a direction specified at the point A. In this manner, the position of the AR content 207 to be arranged in the depth direction may be accurately specified based on the positions specified at the two points. Thus, even if the AR display process is executed on image data acquired at various imaging positions, the AR content 207 is superimposed and displayed near the crack 203.

Return to FIG. 17. When receiving an instruction to execute the authoring process again in Op. 5, the controller 15 reactivates the authoring mode (in Op. 6). If the provisional authoring is already terminated (YES in Op. 7), the second authoring unit 19 executes the main authoring process (in Op. 9). When receiving an instruction to terminate the authoring process from the user after the termination of the main authoring process (YES in Op. 10), the controller 15 terminates the authoring process.

Figure 20:
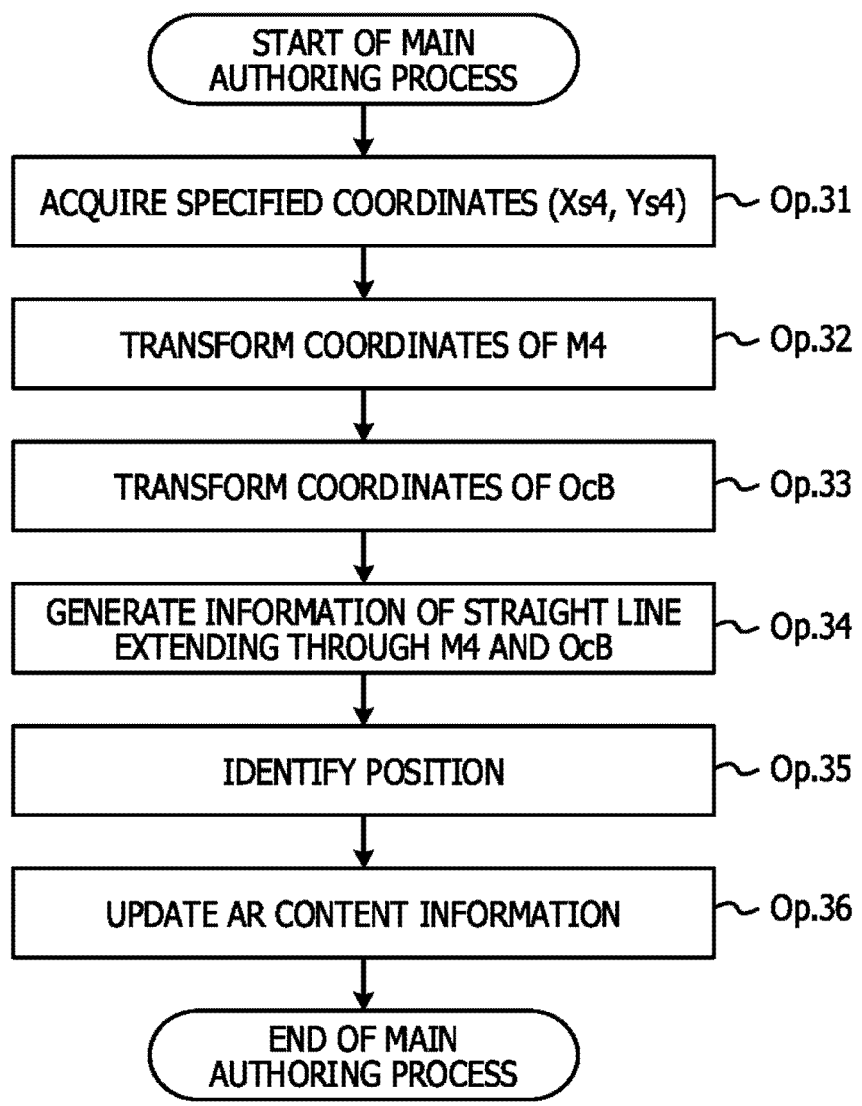
FIG. 20 is a flowchart of a main authoring process.

FIG. 20 is a flowchart of the main authoring process. First, the second authoring unit 19 acquires the position (Xs4, Ys4) specified by the user (in Op. 31).

The second authoring unit 19 transforms the position M4 specified by the user through the camera coordinate system to coordinate values of the marker coordinate system (in Op. 32). In addition, the second authoring unit 19 transforms the origin OcB, corresponding to the imaging position, of the camera coordinate system to coordinate values of the marker coordinate system (in Op. 33). The order that Op. 32 is executed and the order that Op. 33 is executed may be switched with each other. Then, the second authoring unit 19 generates straight line information indicating a straight line extending through the position M4 specified by the user and the origin OcB, corresponding to the imaging position, of the camera coordinate system (in Op. 34).

The second authoring unit 19 identifies, based on the straight line information generated in the provisional authoring process and the straight line information generated in the main authoring process, a position at which the AR content is to be arranged (in Op. 35). Then, the second authoring unit 19 uses the identified position (coordinate values of the marker coordinate system) to update the positional information included in the AR content information stored in Op. 29 (in Op. 36). If a plurality of AR contents exists, the user may select an AR content to be subjected to the main authoring process, and the main authoring process (Op. 9) may be executed.

As described above, according to the present embodiment, the user may accurately specify the position of an AR content to be arranged by performing the simple operations. Specifically, when the user specifies only desired positions at two different points, the display device 1 uses information of the two specified positions to determine the position of the AR content to be arranged. Thus, in the present embodiment, the authoring function that provides high accuracy of specifying a position and high usability may be provided.

The position of an AR content C is accurately determined, as well as a position in a depth direction of the AR content C. Thus, the AR content C is superimposed and displayed at a position corresponding to an object to be associated on an image acquired at an arbitrary imaging position in the AR display process.

First Modified Embodiment

Figure 23:
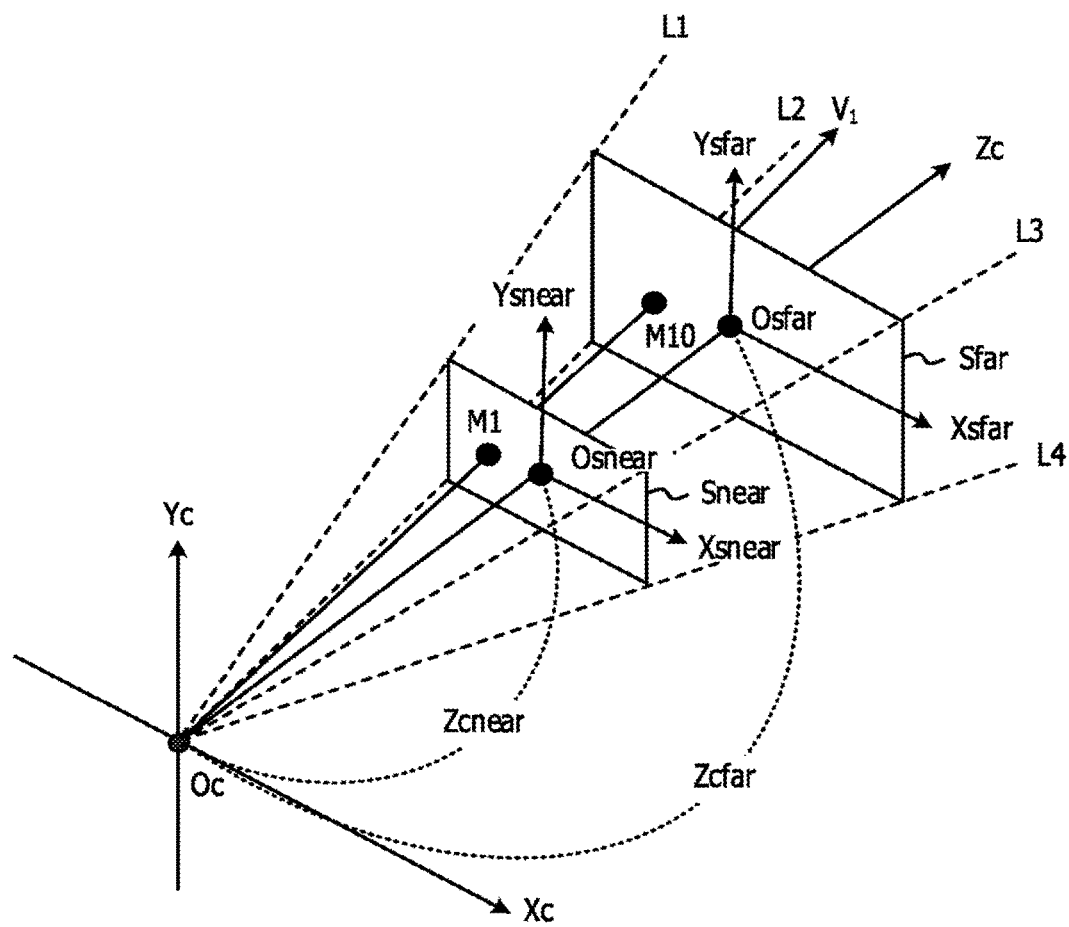
FIG. 23 is a diagram describing a method for calculating a straight line.

A straight line that extends through an imaging position and a position specified by the user may be calculated by the following other method. FIG. 23 is a diagram describing the other method for calculating the straight line. In the AR technique, when a virtual real space is to be projected on a screen, a projection range in which the virtual real space is to be projected is set in some cases. For example, a space that is defined by a first plane Snear extending from the origin of the camera coordinate system to a position of Zcnear in Zc direction and set to be parallel to the Xc-Yc plane and a second plane Sfar extending from the origin of the camera coordinate system to a position of Zcfar and set to be parallel to the Xc-Yc plane may be set as the projection range. In this case, Zcnear and Zcfar are values set in advance.

For example, a position Ms that is located on the touch panel and touched by the user is transformed to a corresponding point M1 located on the plane Snear and a corresponding point M10 located on the plane Sfar. If the projection plane is a part of the plane Snear, the touched position Ms is M1.

For example, the point M1 is calculated based on the point (Xs1, Ys1) and the position Zcnear in Zc direction in which the plane Snear is set. In addition, the point M10 is calculated using a transformation coefficient α for the plane Snear and plane Sfar based on (α·Xs1, α·Ys1) and the position Zcfar in Zc direction in which the plane Sfar is set.

In this case, a vector extending from the point M1 toward the point M10 is the same as the vector V1 extending through the origin Oc of the camera coordinate system and the point M1. Thus, a straight line that extends through the point M1 corresponding to the position specified by the user on the plane Snear and the point M10 corresponding to the position specified by the user on the plane Sfar is used as a provisional AR content. The straight line that extends through the point M1 and the point M10 may be calculated according to Equations 3 and 4.

Second Modified Embodiment

According to another aspect of the embodiment disclosed herein, a projection image of an AR content C may be displayed on a transmission-type display. Even in the other aspect, an image, transmitted to the display by the user, of a real space matches the projection image of the AR content C, and thus visual information provided to the user is augmented.

Third Modified Embodiment

The techniques disclosed in the embodiments are applicable to marker-less vision-based AR. If the technique disclosed in the embodiment is applicable to marker-less vision-based AR, a dictionary (template for object recognition) into which a characteristic of an object to be recognized is learned is prepared for an image recognition process. The object recognition process is executed on image data using the dictionary. Although the object to be recognized is an object (also referred to as natural marker) other than markers M, the technique disclosed in the embodiment is achieved by an algorithm that is the same as or similar to an algorithm used for marker vision-based AR.

Fourth Modified Embodiment

The aforementioned embodiment describes the aspect in which the operation of specifying positions by the user at two points is performed. The embodiment, however, is not limited to this. For example, the provisional authoring process is executed in the same manner as the aforementioned embodiment. After that, the point M1 specified in the provisional authoring process is tracked using a tracking technique. Specifically, a position corresponding to the point M1 on image data acquired from another imaging position is identified by the tracking technique based on the movement of the user.

Then, information of a straight line extending through the point specified by the tracking technique and the other imaging position is generated using the two points in the same manner as the main authoring process according to the aforementioned embodiment. Specifically, the point corresponding to the point M1 identified by the tracking technique corresponds to the point M4 illustrated in FIG. 10, and the imaging position corresponds to the origin OcB.

Exemplary Hardware Configuration

Figure 24:
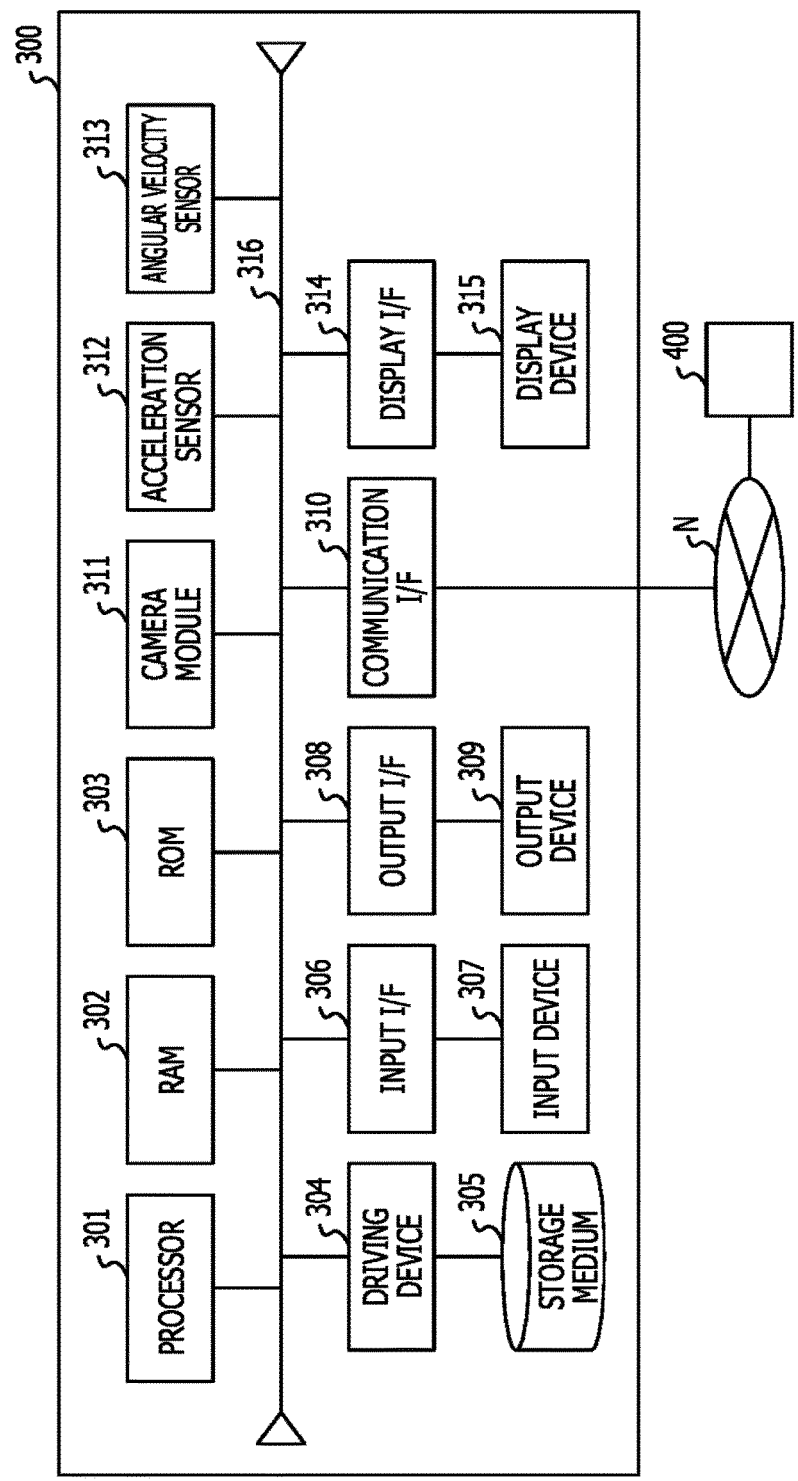
FIG. 24 is a diagram illustrating an exemplary hardware configuration of the display device.

A hardware configuration of the display device 1 according to the embodiments is described. FIG. 24 illustrates an exemplary hardware configuration of the display device. The display device 1 according to the embodiments is achieved by a computer 300. The functional blocks illustrated in FIG. 13 are achieved by the hardware configuration illustrated in FIG. 24, for example. The computer 300 includes a processor 301, a random access memory (RAM) 302, a read only memory (ROM) 303, a driving device 304, a storage medium 305, an input interface (input I/F) 306, an input device 307, an output interface (output I/F) 308, an output device 309, a communication interface (communication I/F) 310, a camera module 311, an acceleration sensor 312, an angular velocity sensor 313, a display interface (display I/F) 314, a display device 315, a bus 316, and the like, for example. The hardware parts are connected to each other through the bus 316.

The communication interface 310 controls communication to be executed through a network N. For the communication controlled by the communication interface 310, wireless communication may be used in order to access the network N through a wireless base station. An example of the communication interface 310 is a network interface card (NIC). The input interface 306 is connected to the input device 307 and transfers an input signal received from the input device 307 to the processor 301. The output interface 308 is connected to the output device 309 and causes the output device 309 to execute outputting in accordance with an instruction from the processor 301. An example of the input interface 306 and the output interface 308 is an I/O controller.

The input device 307 is configured to transmit an input signal in accordance with an operation. The input device is, for example, a key device such as a keyboard or buttons attached to a body of the computer 300 or a pointing device such as a mouse or a touch panel. The output device 309 is configured to output information in accordance with control by the processor 301. The output device 309 is, for example, an audio output device such as a speaker.

The display interface 314 is connected to the display device 315. The display interface 314 causes the display device 315 to display image information written by the processor 301 in a display buffer included in the display interface 314. Examples of the display interface 314 are a graphic card and a graphic chip. The display device 315 is configured to output information in accordance with control by the processor 301. As the display device 315, an image output device such as a display or a transmission-type display is used.

If the transmission-type display is used, the projection image of the AR content C may be controlled and displayed at an appropriate position within the transmission-type display while not being synthesized with an acquired image, for example. Thus, the user visually obtains a state in which a real space matches the AR content C.

For example, an input and output device such as a touch screen is used as the input device 307 and the display device 315. In addition, the input device 307 and the display device 315 may not be included in the computer 300 and may be connected to the computer 300 from the outside.

The RAM 302 may be a readable and writable memory device. For example, a semiconductor memory such as a static RAM (SRAM) or a dynamic RAM (DRAM) or a flash memory other than RAMs may be used as the RAM 302. The ROM 303 includes a programmable ROM (PROM).

The driving device 304 is configured to either read or write or both read and write information from or in the storage medium 305. The storage medium 305 stores information written by the driving device 304. For example, the storage medium 305 is at least one of storage media such as a hard disk, a solid state drive (SSD), a compact disc (CD), a digital versatile disc (DVD), a Blu-ray disc, and the like. The computer 300 includes the driving device 304 for the type of the storage medium 305.

The camera module 311 includes an imaging element (image sensor) and writes data obtained by causing the imaging element to execute photoelectric conversion in an image buffer included in the camera module 311 and provided for input images. The acceleration sensor 312 measures acceleration applied to the acceleration sensor 312. The angular velocity sensor 313 measures an angular velocity of an operation by the angular velocity sensor 313.

The processor 301 reads a program stored in the ROM 303 or the storage medium 305 into the RAM 302 and executes a process in accordance with a procedure of the read program. For example, the function of the controller 15 is achieved by causing the processor 301 to control the other hardware parts based on the authoring program defining the processes illustrated in FIGS. 17, 18, 19, and 20.

The function of the communication unit 11 is achieved by causing the processor 301 to control the communication interface 310 and cause the communication interface 310 to execute data communication so as to cause received data to be stored in the storage medium 305. The function of the image capturing unit 12 is achieved by causing the camera module 311 to write image data in the image buffer for input images and causing the processor 301 to read the image data from the image buffer for input images. The image data is written in the image buffer for input images and written in a display buffer of the display device 315 in parallel in a monitoring mode, for example.

The function of the display unit 13 is achieved by writing image data generated by the processor 301 in the display buffer included in the display interface 314 and causing the display device 315 to display the image data stored in the display buffer. The function of the storage unit 14 is achieved by causing the ROM 303 and the storage medium 305 to store program files and data files or causing the RAM 302 to be used as a work area of the processor 301. For example, AR content information, template information, and the like are stored in the RAM 302.

Figure 25:
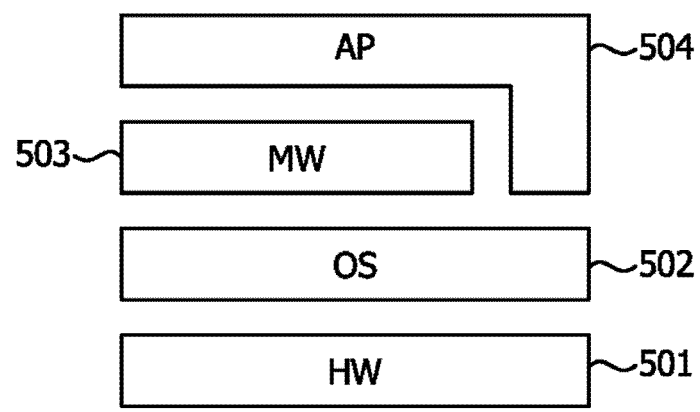
FIG. 25 is a diagram illustrating an exemplary configuration of programs to be executed by a computer.

FIG. 25 illustrates an exemplary configuration of programs to be executed by the computer. In the computer 300, an operating system (OS) 502 that controls a group of hardware is executed. When the processor 301 operates in accordance with a procedure based on the OS 502 and controls and manages the hardware (HW) 501, processes are executed by an application program (AP) 504 and middleware (MW) 503 on the HW 501.

In the computer 300, the programs such as the OS 502, the MW 503, and the AP 504 are read into the RAM 302 and executed by the processor 301.

The authoring program described in the embodiments is called as the MW 503 from the AP 504. Alternatively, the authoring program enables the AR function to be achieved as the AP 504.

The authoring program is stored in the storage medium 305. The storage medium 305 may be distributed while being separated from the body of the computer 300 and storing a display control program according to the embodiment or an AR control program including another program.

Figure 26:
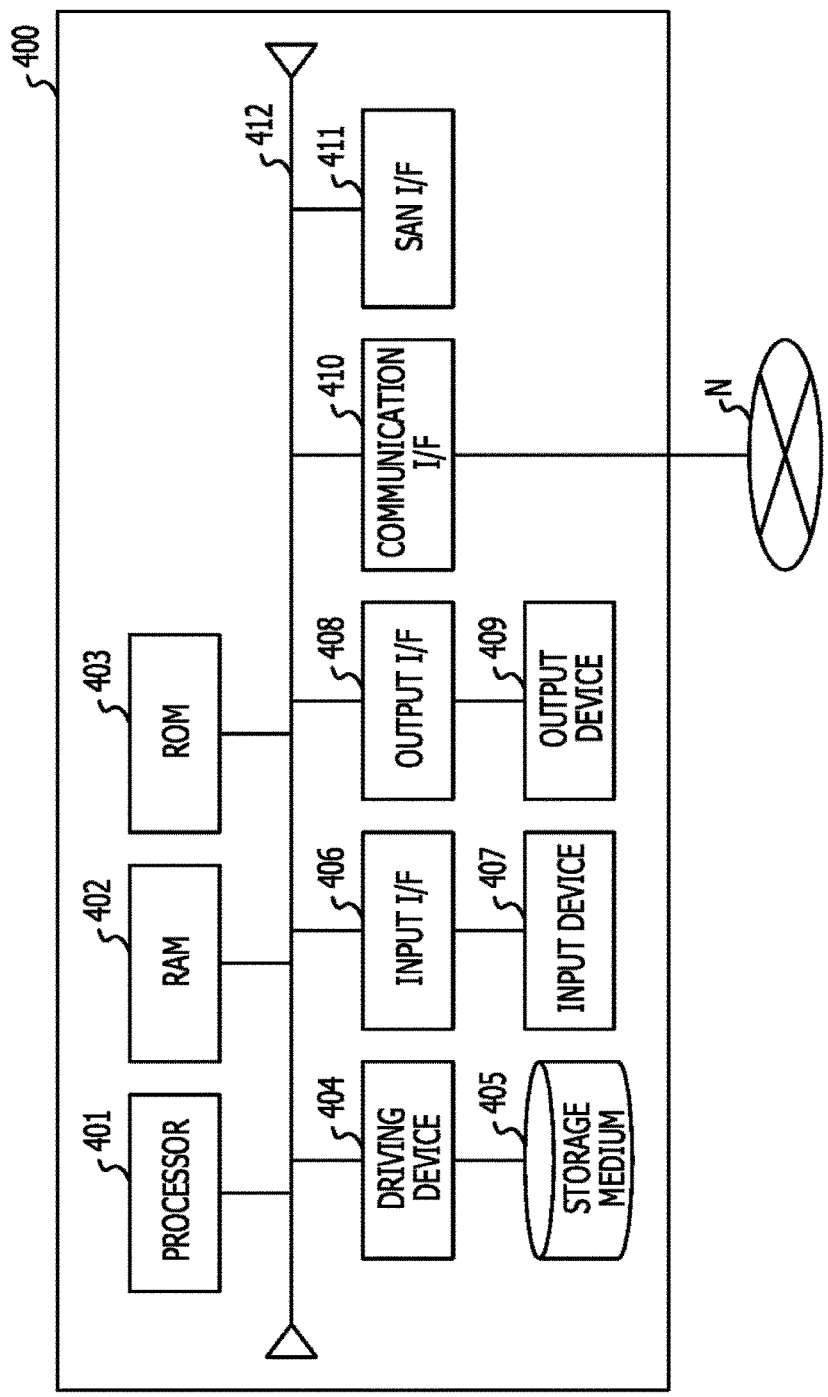
FIG. 26 is a diagram illustrating an exemplary hardware configuration of a managing device.

Next, a hardware configuration of the managing device 2 according to the embodiments is described. FIG. 26 illustrates an exemplary hardware configuration of the managing device. The managing device 2 is achieved by a computer 400. The managing device 2 is achieved by the hardware configuration illustrated in FIG. 26, for example.

The computer 400 includes a processor 401, a RAM 402, a ROM 403, a driving device 404, a storage medium 405, an input interface (input I/F) 406, an input device 407, an output interface (output I/F) 408, an output device 409, a communication interface (communication I/F) 410, a storage area network (SAN) interface (SAN I/F) 411, a bus 412, and the like, for example. The hardware parts are connected to each other through the bus 412.

For example, the processor 401 is hardware that is the same as or similar to the processor 301. The RAM 402 is hardware that is the same as or similar to the RAM 302, for example. The ROM 403 is hardware that is the same as or similar to the ROM 303, for example. The driving device 404 is hardware that is the same as or similar to the driving device 304, for example. The storage medium 405 is hardware that is the same as or similar to the storage medium 305, for example. The input interface 406 is hardware that is the same as or similar to the input interface 306, for example. The input device 407 is hardware that is the same as or similar to the input device 307, for example.

The output interface 408 is hardware that is the same as or similar to the output interface 308, for example. The output device 409 is hardware that is the same as or similar to the output device 309, for example. The communication interface 410 is hardware that is the same as or similar to the communication interface 310, for example. The storage area network (SAN) interface 411 is an interface to be used to connect the computer 400 to an SAN and includes a host bus adapter (HBA).

The processor 401 reads a management program stored in the ROM 403 or the storage medium 405 into the RAM 402 and executes a process in accordance with a procedure of the read management program. In this case, the RAM 402 is used as a work area of the processor 401. The management program is related to a management function of the managing device 2 and used to execute a process of transmitting AR content information to the display device 1 and the like. The management program includes an AR display program if the managing device 2 executes the AR display process.

The managing device 2 stores information of various types by causing the ROM 403 and the storage medium 405 to store program files and data files or causing the RAM 402 to be used as the work area of the processor 401. In addition, the processor 401 controls the communication interface 410 and executes a communication process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. One or more non-transitory computer-readable mediums including computer program, which when executed by a system, causes the system to:

acquire a first image including a specific object, the first image being captured by an electronic device at an imaging position, the specific object having a specific shape, identify the imaging position with respect to the specific object by comparing a first shape of the specific object in the first image with the specific shape, generate first three-dimensional information corresponding to the identified imaging position, generate second three-dimensional information based on a specific depth value and a designated position on the first image which is displayed on a display, generate first line information based on the first three-dimensional information and the second three-dimensional information, acquire a second image including the specific object, the second image being captured by the electronic device at another imaging position, identify the another imaging position with respect to the specific object by comparing a second shape of the specific object in the second image with the specific shape, generate third three-dimensional information corresponding to the identified another imaging position, generate second line information based on the second three-dimensional information and the third three-dimensional information, generate a fourth three-dimensional information based on the first line information and the second line information, and store, into a storage device, the fourth three-dimensional information associated with a content to be displayed on another image when the specific object is detected from the another image.

2. The non-transitory computer-readable mediums according to claim 1, wherein the first three-dimensional information, the second three-dimensional information, the third three-dimensional information and the fourth three-dimensional information are coordination information on three-dimensional space which is set using the specific object as a reference.

3. The non-transitory computer-readable mediums according to claim 1, wherein the content is displayed on the another image at a display position which is determined based on the fourth three-dimensional information.

4. The non-transitory computer-readable mediums according to claim 1, wherein the computer program causes the system to:

output a message prompting to change the imaging position prior to the acquiring of the second image.

5. The non-transitory computer-readable mediums according to claim 1, wherein the computer program causes the system to:

display a line on the second image, the line corresponding to the first line information based on the detected specific object from the second image.

6. The non-transitory computer-readable mediums according to claim 1, wherein a fourth positional information represents a three-dimensional position corresponding to a point at which a straight line represented by the first line information intersects with another straight line represented by the line second information.

7. The non-transitory computer-readable mediums according to claim 1, wherein a fourth positional information represents a three-dimensional position corresponding to a point at which a distance between a straight line represented by the first line information and another straight line represented by the second line information is smallest.

8. The non-transitory computer-readable mediums according to claim 1, wherein the system includes the electronic device including:
   an image capturing device configured to capture the first image and the second image, and
   a communication interface configured to send the first image and the second image to the system via a network.

9. The non-transitory computer-readable mediums according to claim 1, wherein the system includes the electronic device including:
   a display configured to display the content.

* * * * *